United States Patent
Sorenson, III

(10) Patent No.: US 9,898,474 B1
(45) Date of Patent: *Feb. 20, 2018

(54) OBJECT SHARDING IN A HOST-SIDE PROCESSING DEVICE FOR DISTRIBUTED STORAGE

(71) Applicant: Amazon Technologies, Inc., Reno, NV (US)

(72) Inventor: James Christopher Sorenson, III, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 228 days.

This patent is subject to a terminal disclaimer.

(21) Appl. No.: 14/589,919

(22) Filed: Jan. 5, 2015

(51) Int. Cl.
| | |
|---|---|
| *G06F 11/16* | (2006.01) |
| *G06F 17/30* | (2006.01) |
| *H04L 29/06* | (2006.01) |
| *G06F 3/06* | (2006.01) |

(52) U.S. Cl.
CPC .... *G06F 17/30091* (2013.01); *H04L 63/0428* (2013.01); *H04L 63/08* (2013.01); *G06F 3/067* (2013.01); *G06F 2211/103* (2013.01)

(58) Field of Classification Search
CPC ...... G06F 3/067; G06F 3/0601; G06F 3/0602; G06F 3/0604; G06F 3/0605; G06F 3/061; G06F 3/0611; G06F 3/0613; G06F 17/30091; G06F 17/30094;
(Continued)

(56) References Cited

U.S. PATENT DOCUMENTS

| 7,403,658 B2 | 7/2008 | Lin et al. | |
|---|---|---|---|
| 7,779,130 B1 * | 8/2010 | Toutonghi | H04L 63/08 709/227 |

(Continued)

FOREIGN PATENT DOCUMENTS

WO  2011154750  12/2011

OTHER PUBLICATIONS

"Optimizing Cauchy Reed-Solomon Codes for Fault-Tolerant Storage Applications", James S. Plank, Dec. 2005, pp. 1-11.
(Continued)

*Primary Examiner* — Joseph Schell
(74) *Attorney, Agent, or Firm* — Robert C. Kowert; Meyertons, Hood, Kivlin, Kowert & Goetzel, P.C.

(57) ABSTRACT

A host-side network processing device coupled between a storage system and a host machine may encode a data object according to a sharding technique. Encoding the data object may include receiving, from the host machine, a data object and a request to store the data object. The network processing device may send a request for a plurality of storage locations to the storage system. The network processing device may receive a location list including a plurality of location identifiers from the storage system, where each location identifier corresponds to a respective storage location. The network processing device may determine an encoding matrix and encode the data object into a plurality of shards based on the encoding matrix according to a sharding technique. The network processing device may generate a plurality of storage requests that each specify a different location identifier and that each includes a respective shard.

21 Claims, 12 Drawing Sheets

(58) Field of Classification Search
CPC ....... G06F 17/30097; G06F 2211/1028; G06F 2211/103; G11B 2220/412
See application file for complete search history.

(56) References Cited

U.S. PATENT DOCUMENTS

| | | | |
|---|---|---|---|
| 8,019,849 B1* | 9/2011 | Lopilato | G06F 17/302 709/203 |
| 8,209,577 B2 | 6/2012 | Huang et al. | |
| 8,452,819 B1 | 5/2013 | Sorenson, III et al. | |
| 8,621,182 B1* | 12/2013 | Sorenson | H04L 67/1097 711/216 |
| 2008/0183975 A1* | 7/2008 | Foster | G06F 11/1076 711/153 |
| 2008/0313241 A1* | 12/2008 | Li | G06F 11/1076 |
| 2010/0037056 A1 | 2/2010 | Follis et al. | |
| 2012/0030511 A1* | 2/2012 | Wylie | G06F 11/1076 714/15 |
| 2013/0275815 A1 | 10/2013 | De Keyser et al. | |
| 2013/0339301 A1* | 12/2013 | Saito | G06F 17/30289 707/649 |
| 2014/0101283 A1* | 4/2014 | Alnafoosi | G06F 17/30153 709/217 |
| 2014/0223095 A1* | 8/2014 | Storm | G06F 3/067 711/114 |
| 2015/0067421 A1* | 3/2015 | Baptist | H04L 67/1097 714/723 |
| 2015/0193309 A1* | 7/2015 | Khadiwala | G06F 11/1435 714/4.11 |

OTHER PUBLICATIONS

"Optimizing Cauchy Reed-Solomon Codes for Fault-Tolerant Network Storage Applications", James S. Plank, Lihao Xu, the 5th IEEE International Symposium on Network Computing and Applications, Jul. 2006, pp. 1-9.

U.S. Appl. No. 14/133,575, filed Dec. 18, 2013, Bryan James Donlan.

Proceedings of the Ninth International Conference on Architectural Support for Programming Languages and Operating Systems, "OceanStore: An Architecture for Global-Scale Persistent Storage", John Kubiatowicz, et al., Nov. 2000, pp. 1-12.

J. J. Wylie, M. W. Bigrigg, J. D. Strunk, G. R., Ganger, H. Kilite, P. K. Khosla, "Survivable Information Storage Systems", IEEE Computer 33 (8), IEEE, Aug. 2000, pp. 61-68.

A. Malik and P. Lakshman, "Cassandra: a decentralized structured storage system," SIGOPS Operating System Review, vol. 44, No. 2, 2010.

R. Rodrigues and B. Liskov, "High availability in DHTs: Erasure coding vs. replication," in Proc. IPTPS, 2005.

U.S. Appl. No. 14/133,522, filed Dec. 18, 2013, Paul David Franklin.

U.S. Appl. No. 14/543,827, filed Nov. 17, 2014, James Christopher Sorenson.

U.S. Appl. No. 14/570,952, filed Dec. 15, 2014, Mark Robert Sieklucki.

U.S. Appl. No. 14/589,916, filed Jan. 5, 2015, James Christopher Sorenson III.

* cited by examiner

OBJECT SHARDING IN A HOST-SIDE PROCESSING DEVICE FOR DISTRIBUTED STORAGE

BACKGROUND

Modern computing applications require storage of large amounts of data. Over time, the need to storage and retrieve large amounts of data continues to increase. Other common concerns are the ability to store data durably and efficiently. Durability typically refers to the ability to recover data in the event of a failure. Data durability typically requires some form of redundancy in how the data is stored. For example, data may be mirrored to two different storage devices such that an exact replica copy of the data is stored on both storage devices. If one of the storage devices fails, the data can still be retrieved from the other storage device. Some systems desire even stronger levels of durability that involve more complex redundancy encoding scheme that allow the data to still be retrieved even after multiple device failures. Techniques to provide data durability typically incur some amount of overhead, both in terms of the amount of additional storage required and computational overhead, and thus are at odds with the desire to be able to store and retrieve large amounts of data efficiently.

Web-based applications, cloud computing, and other network and Internet based technologies are area frequently requiring storage of large amounts of data with needs for durability and efficiency. The conventional Web model allows clients to access Web resources (e.g., applications, services and data) via an HTTP client program, such as a Web browser. A technology referred to as Web services has been developed to provide programmatic access to Web resources. Web services may be used to provide programmatic access to Web resources including technology platforms (e.g., applications and services) and data (e.g., product catalogs and other databases) hosted on Web-connected computers such as Web server systems via a Web service interface. Generally speaking, a Web service interface may be configured to provide a standard, cross-platform API (Application Programming Interface) for communication between a client requesting some service to be performed and the service provider. In some implementations, a Web service interface may be configured to support the exchange of documents or messages including information describing the service request and response to that request. Such documents, or messages, may be exchanged using standardized Web protocols, such as the Hypertext Transfer Protocol (HTTP), for example, and may be formatted in a platform-independent data format, such as eXtensible Markup Language (XML), for example.

One example of a service that is provided to clients via a Web service interface is a virtual computing service. The advent of virtualization technologies for commodity hardware has provided benefits with respect to managing large-scale computing resources for many clients with diverse needs, allowing various computing resources to be efficiently and securely shared by multiple clients. For example, a virtual computing service may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. With virtualization, the single physical computing device can create, maintain or delete virtual machines in a dynamic manner. In turn, users can request computer resources from a data center and be provided with varying numbers of virtual machine resources on an "as needed" basis or at least on an "as requested" basis. In some systems, virtualized computing resources can be used to implement virtual desktops.

Another example of a service that is provided to clients via a Web service interface is a data storage service. A typical data storage service (which may be referred to herein as an "object-redundant storage system") may receive requests to store data objects on behalf of storage service clients, and may store those data objects using redundancy in order to provide a high level of durability for the stored data. For example, such a data storage service may replicate the objects it stores across different storage nodes to increase the likelihood that object data will survive the failure of any given storage node. In such systems, until a certain minimum number of replicas (e.g., two or three) of an object have been successfully written the write operation may not be considered to be completed. However, for a given object, the actual number of valid replicas (or instances) of that object might at some points in time be less than the target number, for a variety of reasons, and a replacement process may be invoked to correct the situation. For example, if a previously valid replica becomes inaccessible due to a failure of the device on which it was stored, the failed device may be replaced in the system, and another instance of the replica may be written to the replacement device. In some systems, each replica need not correspond to an exact copy of the object data. For example, in some object-redundant storage systems, an object may be divided into a number of portions or "shards" according to a redundant encoding scheme (such as a parity, error correction code or other scheme), such that the object data may be recreated from fewer than all of the generated portions. Typically, object-redundant storage systems may be also seek to improve performance characteristics, such as latency, throughput or availability.

Figure 1:
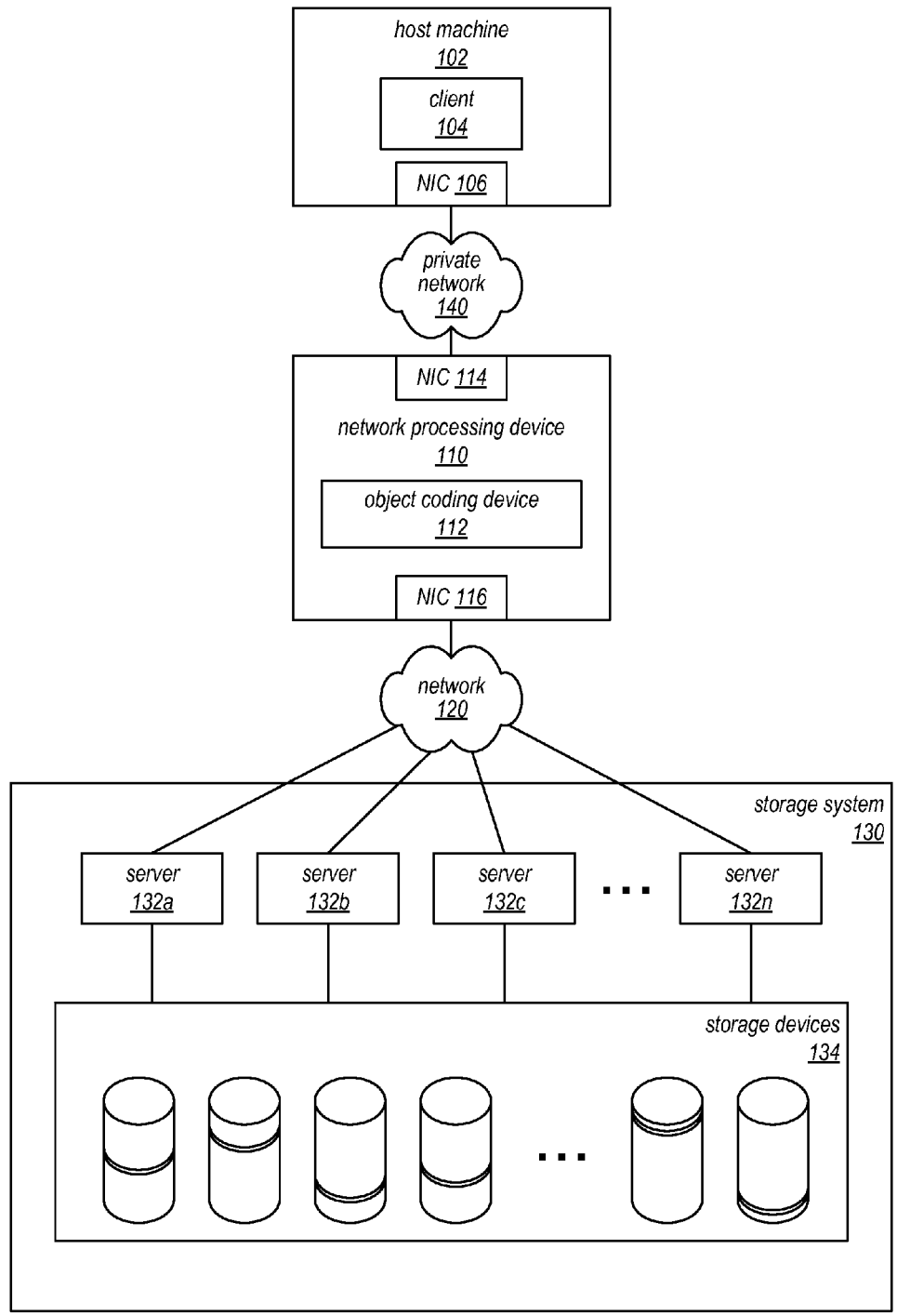
FIG. 1 is a high-level block diagram illustrating operations of an example system where a host-side network processing device can reconstruct a data object.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Various embodiments of systems and methods for providing low latency connections (or communication channels) to workspaces (e.g., virtual desktop instances) in a system that provides virtualized computing resources to clients are described herein. A computing system providing virtual computing services may generate and manage remote computing sessions between client computing devices and virtual desktop instances (workspaces) hosted on the service provider's network. In some embodiments, a service provider's networked environment may include multiple virtual desktop instances, each of which is hosted on a respective one of multiple computing nodes that collectively implement a virtual desktop (workspaces) service. These computing nodes may be located within data centers in multiple network localities (e.g., in different buildings, cities, countries, or regions). For example, each network locality may have network functionalities, cooling capabilities, and power systems which are failure-isolated from each other network locality. In some embodiments, this networked environment may include a virtual computing system configured to perform computing operations for one or more clients and/or a storage service configured to store data for one or more clients. As described in more detail herein, this storage service and a management component of the virtual desktop service may interoperate with each other within a virtual private cloud of the virtual desktop service, and may communicate with each other over a virtual private network.

In some embodiments, the client of the virtual computing services may desire to store data generated using the virtual computing services in a storage service. In some cases, the client may be more concerned about data storage costs than they are about performance-related parameters such as latency, throughput or availability. For example, the client may be willing to trade away some or all of these performance constraints to achieve a more cost-effective storage solution for archival storage, where the data should be stored with some durably, and will be stored for a long time, but it is not going to be accessed very often (if at all). The systems and methods described herein may provide a storage service that is well suited for such storage models, and for other storage models in which the storage service does not store the only instances of the stored data. The storage services described herein as may in some embodiments provide very low cost storage with granular failure detection, and may be offered to storage service clients as a web-based service. These services may in some embodiments be used to build highly durable storage solutions on top of lower cost infrastructures (e.g., the storage systems described herein). Note that in the descriptions that follow, the terms "storage service" and "storage system" may be used somewhat interchangeably to refer to the functionality provided by a storage service or to an underlying computing system (and/or various components thereof) that is configured to implement that functionality.

In some embodiments, the systems described herein may encode or encrypt a data object into a plurality of "shards" using an encoding matrix according to a sharding technique. Each shard may be stored on a different data storage device (e.g., to provide additional failure protection) of the storage service. At a future time, some or all of the shards may be used to reconstruct the original data object using a decoding matrix according to the sharding technique. In some embodiments, the encoding and decoding operations are performed at a host-side in-line network processing device, as opposed to performing the encoding and decoding operations at a server of the storage system. In other embodiments, the encoding and decoding operations are performed at another device, such as a server of the storage system.

FIG. 1 is a high-level block diagram illustrating operations of an example system where a host-side network processing device can encode or reconstruct a data object. In this example, the system includes a host machine 102 configured to request a data object and to request storage of a host data object, a network processing device 110 (e.g., a host-side network processing device) configured to reconstruct the data object from a coded data object and to encode the host data object according to a sharding technique, a storage system 130 configured to store a plurality of coded data objects, a private network 140 that links the network processing device 110 to the host machine 102, and a network 120 that links the network processing device 110 to the storage system 130. In particular, FIG. 1 illustrates a data decoding system of the network processing device 110. In some embodiments, the host machine 102 includes a client computing instance 104 and a network interface controller (NIC) 106. The network processing device 110 may include a host-side NIC 114, an object coding device 112, and a network-side NIC 116. In some embodiments, the network processing device 110 is part of the host machine 102 and the private network 140 is an internal connection (e.g., one or more wires) of the host machine 102. For example, the network processing device 110 may be connected to a Peripheral Component Interconnect (PCI) express connection of the host machine 102. In another embodiment, the network processing device 110 may be located within a different expansion slot of the host machine 102 or may be coupled to a rack switch of the host machine 102. The storage system 130 may include one or more servers 132*a-n* and a plurality of storage devices 134. In some embodiments, the storage system 130 is a distributed system, where multiple storage devices of the storage devices 134 are configured to store different portions of a particular coded data object.

In some embodiments, the host machine 102 is a computing device that implements at least a portion of a virtual computing service. The host machine 102 may include a client computing instance 104 that performs computing processes at the host machine 102 based on requests from a customer. In a particular embodiment, the client computing instance 104 may request (e.g., based on a customer request or based on a process requirement) a data object stored at the storage system 130. The client computing instance 104 may cause the host machine 102 to send, via the private network 140, a data packet including a request for the data object using the NIC 106. As further discussed below with reference to FIG. 6, in some embodiments, the request is encrypted according to an encryption protocol (e.g., a transmission control protocol (TCP) or a secure sockets layer protocol (SSL)). As further discussed below with reference to FIG. 6, in other embodiments, the request is unencrypted.

In some embodiments, the network processing device 110 (e.g., a host-side network processing device) is configured to receive, via the private network 140, the data packet including the request for the data object from the host machine 102 using the host-side NIC 114. Accordingly, the host-side NIC 114 may be coupled to the private network 140. The network processing device 110 may be configured to recognize the request for the data object. In some embodiments, in response to recognizing the request for the data object, the network processing device 110 is configured to insert an in-line object reconstruction indicator into the request for the data object. The in-line object reconstruction indicator may indicate to the storage system 130 that the network processing device 110 can reconstruct the data object from a subset of a plurality of shards corresponding to the data object. The network processing device 110 may be configured to transmit, via the network 120, using the network-side NIC 116, the request for the data object, including the in-line object reconstruction indicator, to the storage system 130. Accordingly, the network-side NIC 116 may be coupled to the network 120. In other embodiments, the network processing device 110 is configured to transmit the in-line object reconstruction indicator to the storage system 130 separately from the request for the data object and to indicate that the in-line object reconstruction is associated with the request for the data object.

In some embodiments, as further described with respect to FIGS. 2, 3A, 3B, and 8, the network processing device 110 receives, in response to the request for the data object, object reconstruction information and a location list (e.g., a storage location list) including a plurality of location identifiers. Each location identifier of the location list may correspond to an address of a shard of the requested data object. In a particular embodiment, the location list includes addresses for each of the shards of the requested data object. In another embodiment, the location list includes identifiers that are used by the storage system 130 to determine addresses for each of the shards of the requested data object. In a different embodiment, the location list includes a subset of the shards of the requested data object. In some embodiments, the network processing device 110 requests, from the storage system 130, the shards corresponding to all of the locations of the location list. In other embodiments, the network processing device 110 requests, from the storage system 130, a subset of the shards corresponding to the locations of the location list. If the network processing device 110 receives more shards than needed to reconstruct the data object, the network processing device 110 may be configured to discard excess shards. In another embodiment, the network processing device 110 receives the shards from the storage system 130 (without receiving the location list). When the network processing device 110 has received a sufficient number of shards to reconstruct the requested data object, the object coding device 112 may be configured to reconstruct the data object from the received subset of shards. In other embodiments, the network processing device 110 receives the requested data object (e.g., a reconstructed data object) from the storage system 130 (as opposed to receiving the location list or the shards). In some embodiments, the network processing device 110, via the host-side NIC 114, is configured to provide the reconstructed data object to the host machine 102.

In some embodiments, the private network 140 and/or the network 120 are internal networks of a service provider. In various embodiments, the private network 140 and/or the network 120 may encompass any suitable combination of networking hardware and protocols necessary to establish communications between the network processing device 110 and the host machine 102 and/or the network processing device 110 and the storage system 130, respectively. For example, the private network 140 and/or the network 120 may generally encompass the various telecommunications networks and service providers that collectively implement the Internet. The private network 140 and/or the network 120 may also include private networks such as local area networks (LANs) or wide area networks (WANs) as well as public or private wireless networks. In some embodiments, the private network 140 and/or the network 120 may be wires that directly connect between the network processing device 110 and the host machine 102 and/or the network processing device 110 and the storage system 130, respectively. In a particular embodiment, the network 120 includes a plurality of paths between the network-side NIC 116 and each of the plurality of servers 132*a-n* of the storage system 130. In some embodiments, portions of one or more paths between the network-side NIC 116 and different servers (e.g., the server 132*a* and the server 132*b*) overlap. In a particular embodiment, the network 120 further connects the network-side NIC 116 and each of the plurality of servers 132*a-n* to other devices which may be associated with the virtual computing service, the storage service, or another service of the service provider. In some embodiments, data packets transmitted between the network processing device 110 and the storage system 130 are transmitted according to a TCP protocol or a SSL protocol. In other embodiments, the data packets are transmitted according to a user datagram protocol (UDP).

As explained above, the storage system 130 may include a plurality of storage devices 134 configured to store different portions of a coded data object. The coded data object may be coded according to a sharding technique such as an erasure coding technique or according to another coding technique. In some embodiments, each respective data object is stored as a respective plurality of shards. Each respective data object can be reconstructed from a particular number of shards. In some embodiments, the particular number of shards is fewer than a total number of shards for that data object. Each shard for a respective data object may be stored on a different one of the plurality of storage devices 134 than any other shard of the plurality of shards for the respective data object. In some embodiments, as discussed further with reference to FIGS. 9-11, the shards may be received, based upon a request from the host machine 102, at the storage system 130 from the network processing device 110 via the plurality of servers 132a-n. Accordingly, the plurality of servers 132a-n of the storage system 130 may be coupled to the network 120. In other embodiments, the shards may be received at the storage system 130 from one or more other devices.

In some embodiments, a given server (e.g., the server 132a) of the plurality of servers 132a-n, responsive to detecting an in-line network object reconstruction indicator associated with a request for a data object, determines whether a corresponding network processing device (e.g., the network processing device 110) should reconstruct the data object. In a particular embodiment, the determination is based on, for example, whether a size of the data object exceeds a size threshold. In a particular embodiment, when the given server determines that the network processing device 110 should reconstruct the data object, the given server generates a location list including a plurality of location identifiers (e.g., addresses) corresponding to the plurality of storage devices 134. In some embodiments, the given server does not include (e.g., by not adding or by removing) location identifiers corresponding to some shards of the plurality of shards, where the location list includes location identifiers corresponding to a sufficient number of shards to reconstruct the data object. In some embodiments, the location identifiers are added to the list based on a determination of approximate network transmission times, as further described with respect to FIG. 5. In some embodiments, the given server returns the location list to the corresponding network processing device in response to the data request without providing the data object (reconstructed or encoded) or the shards. The given server may also return the object reconstruction information (e.g., a decode matrix) to the corresponding network processing device. In some embodiments, any data (e.g., the location list, the object reconstruction information, or other data) provided from the storage system 130 to the corresponding network processing device is formatted such that the corresponding network processing device is unaware of which server of the plurality of servers 132a-n handled the request for the data object.

In some embodiments, the storage system 130 is configured to, responsive to a plurality of requests (e.g., corresponding to the plurality of location identifiers of the location list) for a subset of the plurality of shards from the network processing device 110, for each requested shard, provide the requested shard to the network processing device 110 via the plurality of servers 132a-n. In a particular embodiment, at least two shards of the subset of the plurality of shards are provided to the network processing device 110 via different servers of the plurality of servers 132a-n. For example, a particular shard may be transmitted via the server 132a and a different shard may be transmitted via the server 132b. In another embodiment, the storage system 130 is configured to, responsive to a request for the data object, provide the plurality of shards to the network processing device 110 via a particular server (e.g., the server 132a) of the plurality of servers 132a-n. In some embodiments, the data object (e.g., the data object, the shards, or other data) provided from the storage system 130 to the network processing device 110 is formatted such that the network processing device 110 is unaware of which server of the plurality of servers 132a-n handled the request for the data object. Although FIG. 1 illustrates the network processing device 110 transmitting signals to the plurality of servers 132a-n directly, in some embodiments, the network processing device 110 sends signals to one or more load balancers, which forward the signals to the plurality of servers 132a-n. Similarly, Although FIG. 1 illustrates the network processing device 110 receiving signals from the plurality of servers 132a-n directly, in some embodiments, the plurality of servers 132a-n send signals to one or more load balancers, which forward the signals to the network processing device 110. Although the examples provided herein may be particularly applicable to a network-based distributed storage system, in other embodiments, any form of distributed storage system may be used.

Figure 2:
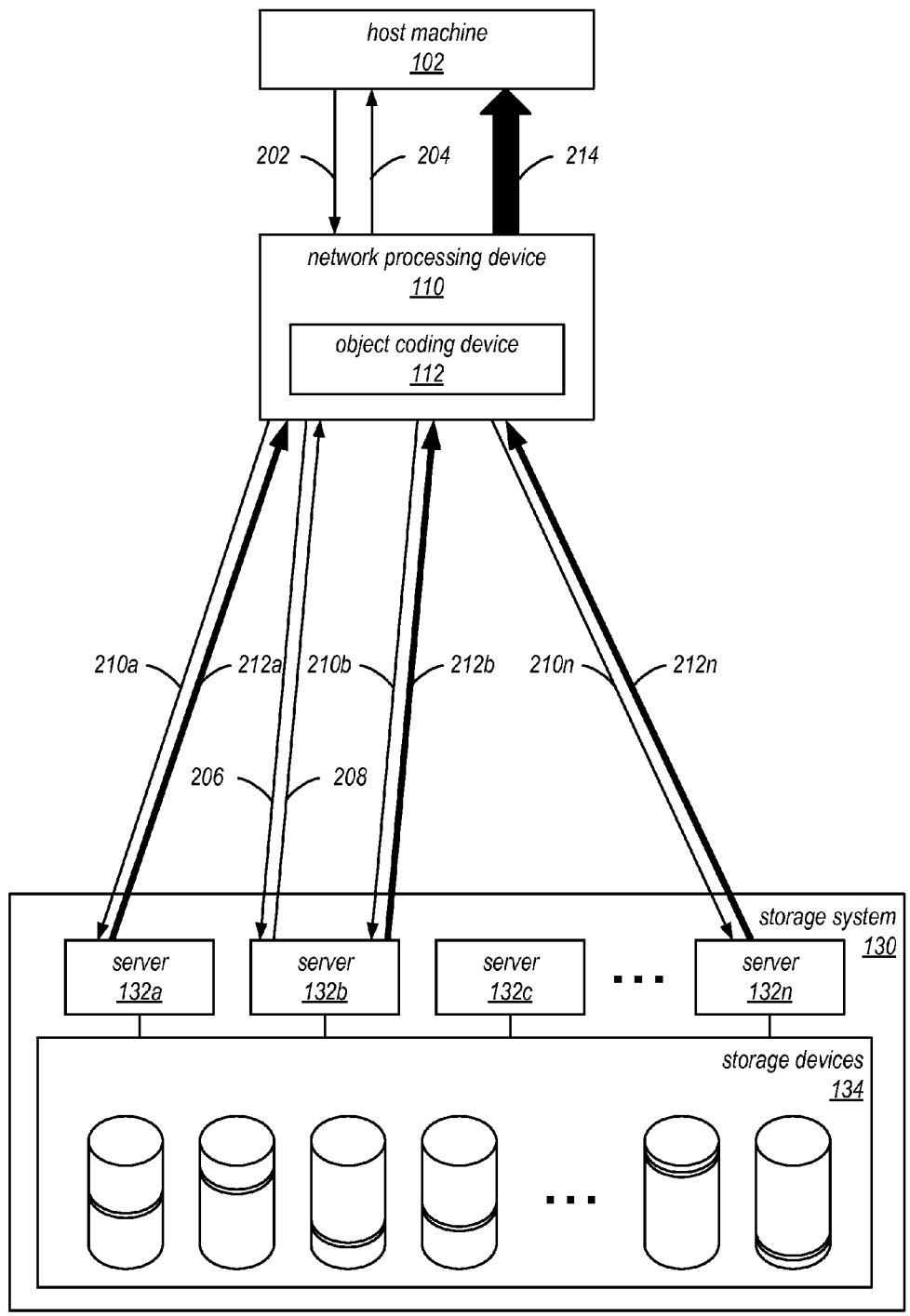
FIG. 2 is a block diagram illustrating an example of a reconstruction operation implemented by a host-side network processing device, according to at least some embodiments.

FIG. 2 illustrates an example of a reconstruction operation implemented by a host-side network processing device, according to at least some embodiments. With reference to FIG. 2, an illustrative response to a data object request by a host machine will be described. In a particular embodiment, an object reconstruction operation is performed by the network processing device 110 of FIG. 1. In this example, for clarity purposes, portions of the system of FIG. 1. are not illustrated, though they may be present and may operate as described previously. For example, messages may be passed from the host machine 102 using the NIC 106. Similarly, signals between the network processing device 110 and the storage system 130 may be transmitted via the network 120.

In some embodiments, the host machine 102 may transmit a data packet 202 to the network processing device 110. The data packet 202 may include a request for a data object. In a particular embodiment, the data packet 202 is encrypted (e.g., because the host machine 102 believes it is sending the data packet over the network 120 to the storage system 130). In the particular embodiment, the network processing device 110 may decrypt the data packet and detect the request for the data object. In the particular embodiment, the network processing device 110 may send a response packet 204 (e.g., a handshake response) to the host machine 102, acknowledging the request for the data object. In some embodiments, the response packet 204 may be formatted such that the host machine 102 determines that the response packet 204 is received from the storage system 130. In a different particular embodiment, the data packet 202 is not encrypted (e.g., the data packet 202 is transmitted in a "clear-text" format). In such embodiments, the host machine 102 may send the data packet 202 to the network processing device 110 unencrypted because the host machine 102 expects the network processing device 110 to encrypt a request for the data object (e.g., the host machine 102 is aware of the network processing device 110). Accordingly, the network processing device 110 may be configured to encrypt a message sent to the storage system 130.

As described above with reference to FIG. 1, in some embodiments, the network processing device 110 forms a data object request 206 using contents of the data packet 202 (e.g., a data object identifier and/or credentials associated with the host machine 102) and an in-line network object reconstruction indicator. The network processing device 110 may send the data object request 206 to the storage system 130. In some embodiments, the network processing device 110 does not address the data object request 206 to a particular server of the plurality of servers 132a-n. For example, the storage system 130 may be addressable via a main address (e.g., a main uniform resource locator (URL) or a main uniform resource indicator (URI)) for the storage system 130. In the example, the storage system 130 may determine which server of the plurality of servers 132a-n receives the data object request 206 (e.g., based on a load balancing scheme). In other embodiments, the network processing device 110 addresses a specific server (e.g., the server 132b).

In the illustrated embodiment, the data object request 206 is received by the server 132b. In the illustrated embodiment, the server 132b determines that the host machine 102 is authorized to receive the requested data object. In other embodiments, in response to a particular server determining that a particular host machine is not authorized to receive a particular data object, the server may provide an error message to the particular host machine, ignore the request for the particular data object, or perform another action according to an error protocol.

In the illustrated embodiment, after authorizing the data object request 206, the server 132b detects the in-line object reconstruction indicator, which informs the server 132b that the network processing device 110 is capable of reconstructing the data object, where the data object is coded according to a sharding technique and stored at the plurality of storage devices 134 as a plurality of shards. The server 132b may determine whether the network processing device 110 should reconstruct the data object (e.g., based on whether a size of the data object exceeds a size threshold or based on a network load associated with the storage system 130). In the illustrated embodiment, the server 132b determines that the network processing device 110 should reconstruct the data object and generates a location list corresponding to the data object. The location list may include a plurality of location identifiers (e.g., storage locations or identifiers which can be recognized as storage locations by the storage system 130), where each location identifier corresponds to a different respective shard of a plurality of shards. Each location identifier may point to a particular memory location of a respective storage device of the plurality of storage devices 134. In some embodiments, each location identifier is encoded such that the network processing device 110 is unable to decode the plurality of location identifiers. Generating the location list may include looking up the shard locations of the requested data object from a database or another memory location. The server 132b may also retrieve or generate object reconstruction information corresponding to the data object (e.g., a decode matrix). In the illustrated embodiment, the server 132b generates a data object response 208 that includes the location list and the object reconstruction information and returns the data object response 208 to the network processing device 110.

In the illustrated embodiment, in response to receiving the data object response 208, the network processing device 110 sends a plurality of shard requests 210a-n corresponding to a subset of the plurality of shards. The subset of the plurality of shards may include all shards of the plurality of shards or less than all shards of the plurality of shards. The subset of the plurality of shards may include a sufficient number of shards to reconstruct the data object. Each shard request of the plurality of shard requests 210a-n may correspond to a different respective location identifier from the location list.

As shown in the illustrated embodiment, the plurality of shard requests 210a-n may be received at the storage system 130 at different servers of the plurality of servers 132a-n (e.g., the server 132a and the server 132b). In some embodiments, a particular server may receive more than one shard request. In some embodiments, not every server of the plurality of servers 132a-n receives a shard request of the plurality of shard requests 210a-n. For example, in the illustrated embodiment, the server 132c does not receive a shard request. In the illustrated embodiment, the server 132b, which provided the data object response 208 to the network processing device 110, receives the shard request 210b. However, in other embodiments, a given server which provides a data object response may not receive a shard request. In some embodiments, each server that received a shard request may decode a corresponding location identifier included in the shard request to determine a storage location of the requested shard. Each server of the plurality of servers 132a-n that received a shard request may retrieve the requested shard from a requested storage location (e.g., from a corresponding storage device of the plurality of storage devices 134) independently of the other servers of the plurality of servers 132a-n. Further, each server of the plurality of servers 132a-n that received a shard request may transmit the retrieved shard to the network processing device 110 as one of a plurality of shard responses 212a-n. In some embodiments, each server of the plurality of servers 132a-n that received a shard request retrieves object reconstruction corresponding to the requested shard in response to the shard request. In such embodiments, the object reconstruction information is transmitted to the network processing device 110 as part of the corresponding shard response of the plurality of shard responses 212a-n or as a separate transmission.

As shown in the illustrated embodiment, the plurality of shard responses 212a-n may be received by the network processing device 110. In some embodiments, the plurality of shard responses 212a-n are received at the network processing device 110 via different network paths. The plurality of shard responses 212a-n may include a sufficient number of shards to reconstruct the requested data object. The object coding device 112, using the received shards and the object reconstruction information, may reconstruct the data object 214. The network processing device 110 may transmit the data object 214 to the host machine 102. In some embodiments, the network processing device 110 may encode the data object 214 according to an encryption protocol prior to providing the data object 214 to the host machine 102.

Although FIG. 2 illustrates the network processing device 110 transmitting signals (e.g., the data object request 206) to the plurality of servers 132a-n directly, in some embodiments, the network processing device 110 sends signals to one or more load balancers, which forward the signals to the plurality of servers 132a-n. Similarly, Although FIG. 2 illustrates the network processing device 110 receiving signals (e.g., the data object response 208) from the plurality of servers 132a-n directly, in some embodiments, the plurality of servers 132a-n send signals to one or more load balancer, which forward the signals to the network processing device 110.

Figure 3A:
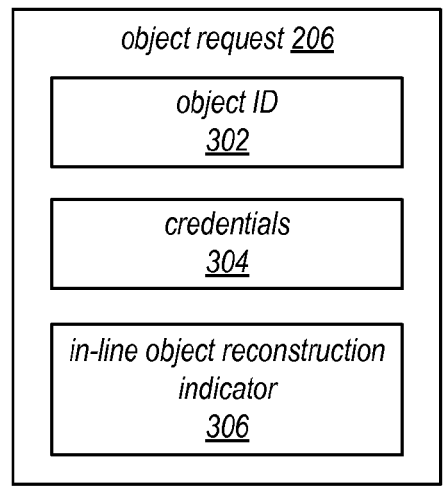
FIG. 3A is a block diagram illustrating an example data object request, according to some embodiments.

FIG. 3A illustrates an example of the data object request 206 described by FIG. 2. In some embodiments, the data object request 206 may include an object identifier 302, credentials 304, and an in-line object reconstruction indicator 306. In other embodiments, some or all of the illustrated components of the data object request 206 may be excluded from the data object request 206. For example, the in-line object reconstruction indicator 306 may be provided to the storage system 130 separately from the object identifier 302. Similarly, the credentials 304 may not be required for the requested data object, and thus, the credentials 304 may be omitted. The object identifier 302 may identify the data object requested by the host machine 102. Accordingly, the object identifier 302 may be used by the storage system 130 to determine which data object to provide to the host machine 102 (e.g., via the network processing device 110).

The credentials 304 may include security credentials of the host machine 102, the network processing device 110, or both. The credentials 304 may be used by the storage system 130 to determine whether the host machine 102 is authorized to receive the requested data object. The in-line object reconstruction indicator 306 may indicate to the storage system 130 that the network processing device 110 is capable of reconstructing the data object from a plurality of shards.

Figure 3B:
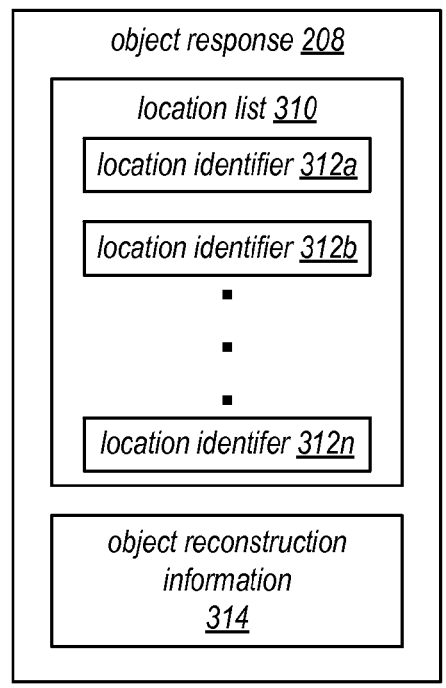
FIG. 3B is a block diagram illustrating an example data object response, according to some embodiments.

FIG. 3B illustrates an example of the data object response 208 described by FIG. 2. In some embodiments, the data object response 208 may include a location list 310 and object reconstruction information 314. In other embodiments, some or all of the illustrated components of the data object response 208 may be excluded from the data object response 208. For example, the object reconstruction information 314 may be provided to the network processing device 110 separately from the location list 310. In the illustrated embodiment, the location list 310 includes a plurality of location identifiers 312a-n, where each location identifier corresponds to a shard of the requested data object. For example, the location list 310 may include a list of URIs or URLs, where each URI or URL addresses a particular shard and specifies a particular server of the plurality of servers 132a-n to provide the shard. Additionally, each location identifier 1012a-n of the location list 310 may be encrypted such that the network processing device 110 cannot decrypt the location identifiers 312a-n (e.g., the plurality of servers 132a-n will decrypt the location identifiers 312a-n to determine the designated storage locations). In a particular embodiment, each location identifier of the plurality of location identifiers 312a-n specifies a different memory location corresponding to a different storage device of the plurality of storage devices 134. The object reconstruction information 314 may be used by the network processing device 110 to reconstruct the data object from a plurality of shards. For example, the object reconstruction information 314 may be a decode matrix or an encode matrix that can be converted into a decode matrix.

Figure 4:
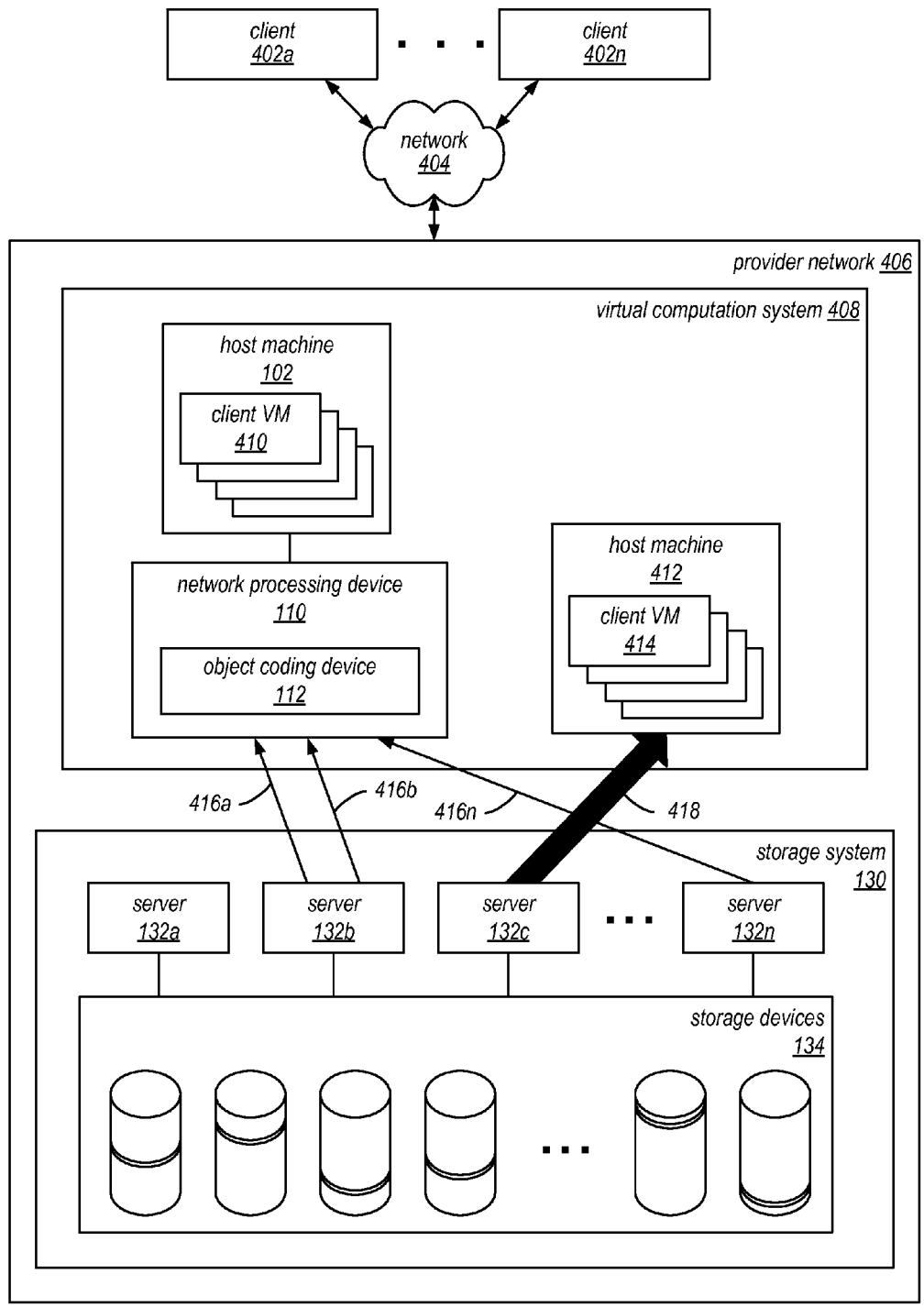
FIG. 4 is a block diagram illustrating a service system architecture that may be configured to perform a reconstruction operation, according to some embodiments.

One embodiment of a service system architecture, including the system described by FIGS. 1-3B, that may be configured to perform a reconstruction operation, is shown in FIG. 4. In the illustrated embodiment, a number of clients (shown as clients 402a-n) may be configured to interact with a provider network 406 via a network 404. The provider network 406 may include a plurality of systems including a virtual computation system 408 and the storage system 130 of FIG. 1. In the illustrated embodiment, the virtual computation system includes the host machine 102 coupled to the network processing device 110 and a host machine 412. In the illustrated embodiment, the host machine 102 includes a plurality of client virtual machine (VM) instances 410. In a particular embodiment, a particular client VM instance of the plurality of client VM instances 410 corresponds to the client computing instance 104 of FIG. 1. In the illustrated embodiment, the host machine 412 includes a plurality of client VM instances 414. Each client VM instance of the plurality of client VM instances 410 and the plurality of client VM instances 414 may respectively correspond to different clients of the clients 402a-n (e.g., one client VM instance may correspond to the client 402a and another client VM instance may correspond to the client 402b). Alternatively, as an example, at least some of the client VM instances of the plurality of client VM instances 410 and the plurality of client VM instances 414 may correspond to the client 402a. As described above with reference to FIG. 1, the storage system 130 includes a plurality of servers 132a-n and a plurality of storage devices 134. It is noted that where one or more instances of a given component may exist, reference to that component herein may be made in either the singular or the plural. However, usage of either form is not intended to preclude the other.

In some embodiments, the host machine 102, the network processing device 110, and the storage system 130 are configured to perform the reconstruction operation described above with reference to FIGS. 1 and 2. Accordingly, in response to a plurality of shard requests (e.g., the plurality of shard requests 210a-n described above with reference to FIG. 2) corresponding to a data object request from a particular client VM instance of the plurality of client VM instances 410, the storage system 130 may provide to the network processing device 110 a plurality of shard responses 416a-n. In some embodiments, the plurality of shard responses 416a-n correspond to the plurality of shard responses 212a-n. In the illustrated embodiment, the server 132b provides more than one shard response of the plurality of shard responses 416a-n (i.e., the shard response 416a and the shard response 416b). In the illustrated embodiment, the server 132a and the server 132c do not provide a shard response of the plurality of shard responses 416a-n to the network processing device 110.

In some embodiments, the host machine 412 and the storage system 130 are configured to perform the reconstruction operation described above with reference to FIGS. 1 and 2. In the illustrated embodiment, the storage system 130 does not receive an in-line object reconstruction indicator with a data object request from a particular client VM instance of the plurality of client VM instances 414 on the host machine 412. Accordingly, the storage system 130 may determine that there is no network processing device (e.g., the network processing device 110) between the host machine 412 and the storage system 130 that can reconstruct a data object according to a sharding technique. In some embodiments, the storage system 130 reconstructs a requested data object from a corresponding plurality of shards using one or more of the plurality of servers 132a-n. In the illustrated embodiment, the server 132c is used to reconstruct the data object and transmits the reconstructed data object to the host machine 412 as part of a data object transmission 418.

In some embodiments, the particular server of the plurality of servers 132a-n used to provide a particular shard response is determined based upon a locality of the particular server to a particular storage device of the plurality of storage devices 134 that stores a shard to be transmitted in the particular shard response, as further described with reference to FIG. 5. Similarly, in some embodiments, the particular server of the plurality of servers 132a-n used to provide a particular data object transmission is determined based upon a locality of the particular server to one or more particular storage device of the plurality of storage devices 134 that stores shards to be used to reconstruct the data object, as further described with reference to FIG. 5. In some embodiments, the particular server of the plurality of servers 132a-n used to provide a particular shard response or a particular data object transmission is determined based upon a work load or a network load corresponding to the particular server. For example, the server 132c may not be selected to provide one of the shard responses because the server 132c has been selected to provide the data object transmission 418, which may consume a more computation and/or network resources as compared to a single shard response of the plurality of shard responses 416a-n.

In various embodiments, the components illustrated in FIG. 4 may be implemented directly within computer hardware, as instructions directly or indirectly executable by computer hardware (e.g., a microprocessor, a computer system, or one or more hardware processors), or using a combination of these techniques. For example, the components of FIG. 4 may be implemented by a distributed system including a number of computing nodes (or simply, nodes), such as the computer system embodiment shown in FIG. 12 and discussed below. In various embodiments, the functionality of a given service system component (e.g., a service system architecture component) may be implemented by a particular node or distributed across several nodes. In some embodiments, a given node may implement the functionality of more than one service system component (e.g., more than one service system architecture component).

Generally speaking, the clients 402a-n may encompass any type of client configurable to submit web services requests to the provider network 406 via the network 404, including requests for storage services and requests for virtual computing services. For example, a given client 402a may include a suitable version of a web browser, or a plugin module or other type of code module configured to execute as an extension to or within an execution environment provided by a web browser. Alternatively, a client 402b may encompass an application such as a database application, media application, office application or any other application that may make use of persistent storage resources. In some embodiments, such an application may include sufficient protocol support (e.g., for a suitable version of Hypertext Transfer Protocol (HTTP)) for generating and processing web services requests without necessarily implementing full browser support for all types of web-based data. That is, the client 402b may be an application configured to interact directly with the systems of the provider network 406 (e.g., the virtual computation system 408, the storage system 130, another system (not shown), or any combination thereof). As described herein, the client 402b may be configured to generate web services requests according to a Representational State Transfer (REST)-style web services architecture, a document- or message-based web services architecture, or another suitable web services architecture.

In other embodiments, a client 402n may be configured to provide access to web services-based storage to other applications in a manner that is transparent to those applications. For example, the client 402n may be configured to integrate with an operating system or file system to provide storage in accordance with a suitable variant of the storage model described herein. However, the operating system or file system may present a different storage interface to applications, such as a conventional file system hierarchy of files, directories and/or folders. In such an embodiment, applications may not need to be modified to make use of the network processing service model of FIG. 1. Instead, the details of interfacing to the provider network 406 may be coordinated by the client 402n and the operating system or file system on behalf of applications executing within the operating system environment.

The clients 402a-n may convey web services requests to and receive responses from the provider network 406 via the network 404. In various embodiments, the network 404 may encompass any suitable combination of networking hardware and protocols necessary to establish web-based communications between the clients 402a-n and the systems of the provider network 406. For example, the network 404 may generally encompass the various telecommunications networks and service providers that collectively implement the Internet. The network 404 may also include private networks such as local area networks (LANs) or wide area networks (WANs) as well as public or private wireless networks. For example, both a given client 402a and the provider network 406 may be respectively provisioned within enterprises having their own internal networks. In such an embodiment, the network 404 may include the hardware (e.g., modems, routers, switches, load balancers, proxy servers, etc.) and software (e.g., protocol stacks, accounting software, firewall/security software, etc.) necessary to establish a networking link between a given client 402a and the Internet as well as between the Internet and the provider network 406. It is noted that in some embodiments, the clients 402a-n may communicate with the systems of the provider network 406 using a private network rather than the public Internet. For example, the clients 402a-n may be provisioned within the same enterprise as the provider network 406. In such a case, the clients 402a-n may communicate with the systems of the provider network 406 entirely through a private network (e.g., a LAN or WAN that may use Internet-based communication protocols but which is not publicly accessible).

Generally speaking, the provider network 406 may be configured to implement one or more service endpoints configured to receive and process web services requests, such as requests to decode data objects or requests for virtual computing services. For example, the provider network 406 may include hardware and/or software configured to implement a particular endpoint, such that an HTTP-based web services request directed to that endpoint is properly received and processed. In one embodiment, the provider network 406 may be implemented as a server system configured to receive web services requests from the clients 402a-n and to forward them to components of a host machine 102 to provide a virtual computation service. Alternatively, the web services requests may be forwarded to the storage system 130 to provide an object-redundant storage service. In other embodiments, the provider network 406 may be configured as a number of distinct systems (e.g., in a cluster topology) implementing load balancing and other request management features configured to dynamically manage large-scale web services request processing loads. In various embodiments, the provider network 406 may be configured to support REST-style or document-based (e.g., SOAP-based) types of web services requests.

In addition to functioning as an addressable endpoint for clients' web services requests, in some embodiments, the provider network 406 may implement various client management features. For example, the provider network 406 may coordinate the metering and accounting of client usage of web services, including storage resources, such as by tracking the identities of requesting clients 402a-n, the number and/or frequency of client requests, the size of objects stored or retrieved on behalf of the clients 402a-n, overall storage bandwidth used by the clients 402a-n, class of storage requested by the clients 402a-n, or any other measurable client usage parameter. The provider network 406 may also implement financial accounting and billing systems, or may maintain a database of usage data that may be queried and processed by external systems for reporting and billing of client usage activity. In certain embodiments, the provider network 406 may be configured to collect, monitor and/or aggregate a variety of storage service system operational metrics, such as metrics reflecting the rates and types of requests received from the clients 402a-n, bandwidth utilized by such requests, system processing latency for such requests, system component utilization (e.g., network bandwidth and/or storage utilization within the storage service system), rates and types of errors resulting from requests, characteristics of requested objects (e.g., size, data type, etc.), or any other suitable metrics. In some embodiments such metrics may be used by system administrators to tune and maintain system components, while in other embodiments such metrics (or relevant portions of such metrics) may be exposed to the clients 402a-n to enable such clients to monitor their usage of services provided by the provider network 406 (or the underlying systems that implement those services).

In some embodiments, the provider network 406 may also implement user authentication and access control procedures. For example, for a given web services request to access a particular data object (e.g., an encoded/encrypted data object) stored at the storage system 130, the provider network 406 may be configured to ascertain whether the client 402 associated with the request is authorized to access the particular data object. The provider network 406 may determine such authorization by, for example, evaluating an identity, password or other credential against credentials associated with the particular data object, or evaluating the requested access to the particular data object against an access control list for the particular data object. For example, if a client 402 does not have sufficient credentials to retrieve the particular object, the provider network 406 may reject the corresponding web services request, for example by returning a response to the requesting client 402 indicating an error condition. Various access control policies may be stored as records or lists of access control information by the host machine 102, the host machine 412, the network processing device 110, the storage system 130, and/or other virtual computing services (not shown).

It is also noted that while provider network 406 may represent the primary interface through which clients 402a-n may access the features of a storage system that implements the virtual computation system 408 and the storage system 130, the provider network 406 need not represent the sole interface to such features. For example, an alternate API that may be distinct from a web services interface may be used to allow clients internal to the enterprise providing the storage service system to bypass the provider network 406. In some cases, the accounting and/or credentialing services of the provider network 406 may be unnecessary for internal clients such as administrative clients or between service components within the same enterprise.

Note that while several examples included herein describe a virtual computation system and an object-redundant storage service as Web-based services exposed to clients, in other embodiments, the virtual computation service, the object-redundant storage service, or both, may be internal to a computing system or an enterprise system and may not be exposed to external clients (e.g., users or client applications). For example, a client may store objects to a primary storage service (a storage service other than an object-redundant storage service), and the primary storage service or an operating system (or another system component) may cause the object (or a replica or shard thereof) to be stored to an object-redundant storage service instead of or in addition to storing the object to the primary storage service. In another example, the operating system, a backup process, or another system component may back up a primary storage system (e.g., periodically, automatically or in response to a request to do so) to an object-redundant storage system. In these examples, the "client" of the storage system 130 may be another application internal to a web services platform (such as the virtual computation system 408).

Figure 5:
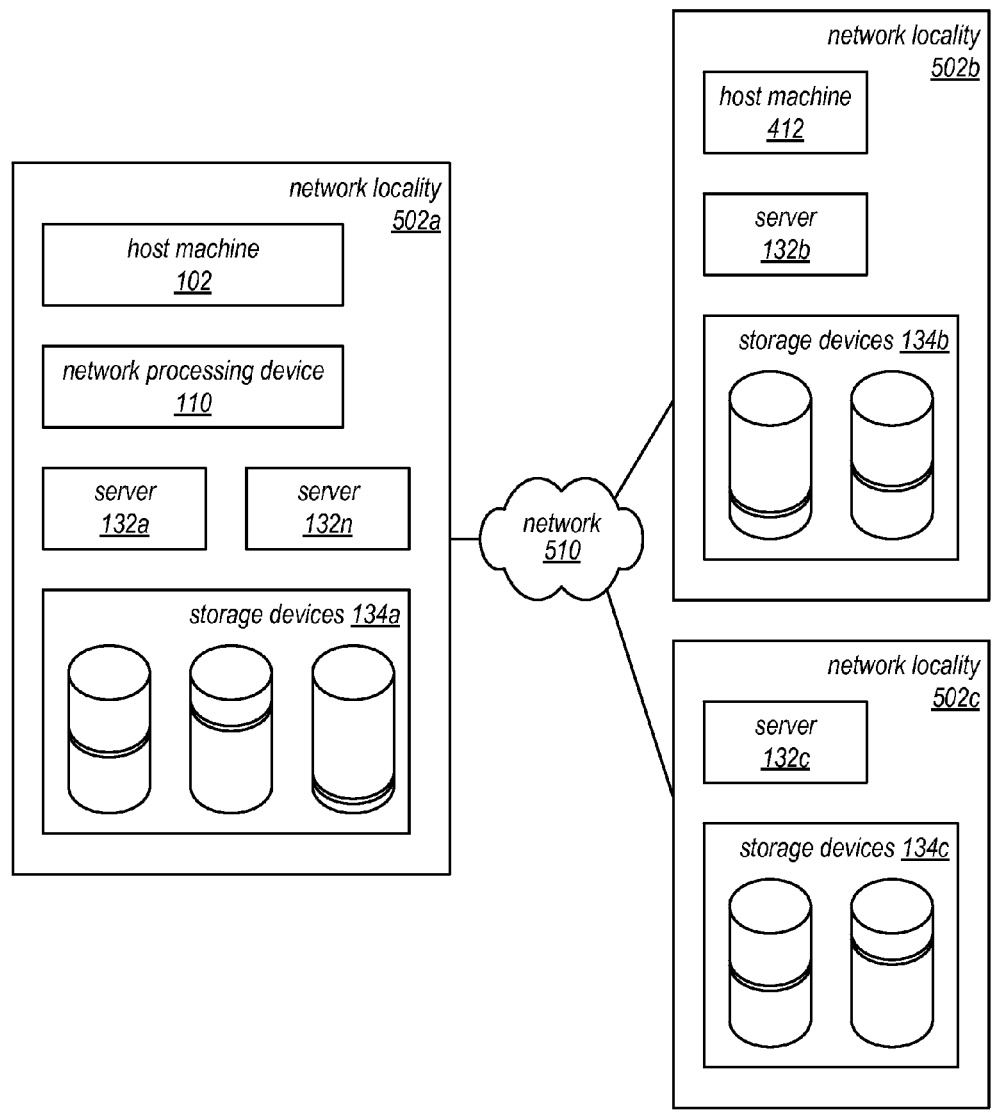
FIG. 5 is a block diagram illustrating an example service system architecture, according to some embodiments, including a plurality of network localities.

FIG. 5 is a block diagram illustrating an example service system architecture, according to some embodiments, including a plurality of network localities. In the illustrated embodiment, the host machine 102, the network processing device 110, the plurality of servers 132a-n, and the plurality of storage devices 134 (e.g., the plurality of storage devices 134a-c illustrated in FIG. 5) of FIG. 1 and the host machine 412 of FIG. 4 are divided among a plurality of network localities 502a-c. In the illustrated embodiment, the plurality of network localities 502a-c are connected by a network 510. In some embodiments, the plurality of network localities 502a-c may correspond to a portion of or to all of the provider network 406 of FIG. 4. In some embodiments, the network 510 may correspond to a portion of or to all of the network 120 of FIG. 1, the private network 140 of FIG. 1, the network 404, or any combination thereof.

In some embodiments, a network locality is a set of resources for storing and/or providing access to at least some of the shards, where the set of resources shares a common infrastructure that is isolated from other network localities. For example, each network locality of the plurality of network localities 502a-c may correspond to a different building (e.g., data center), city, country, or geographic region. In some embodiments, each network locality of the plurality of network localities 502a-c has network functionalities, cooling capabilities, power systems, or a combination thereof which are failure-isolated from each other network locality of the plurality of network localities 502a-c. In some embodiments, network transmission times within a particular network locality (e.g., the network locality 502a) may be faster, as compared to network transmission times using the network 510. At least some network localities may include machines that host virtual compute instances such as a client instance that requests a shard. Additionally, the storage system 130 of FIG. 1 may operate based on a division of requested shards among the plurality of network localities. To illustrate, when less than all of the stored shards of a data object are needed to reconstruct the data object, the storage system 130 (e.g., using one or more servers of the plurality of servers 132a-n) may select, for the location list 310 of FIG. 3, a subset of the shards to send to the network processing device 110 based on a plurality of approximate network transmission times, where each respective approximate network transmission time represents a transmission time between a respective storage device of the plurality of storage devices 134 storing the shards and the network processing device 110.

For example, in the illustrated embodiment, three requested shards are stored by the storage devices 134a in the network locality 502a, two requested shards are stored by the storage devices 134b in the network locality 502b, and two requested shards are stored by the storage devices 134c in the network locality 502c. Further, in the illustrated embodiment, the host machine 102 and the network processing device 110 are located in the network locality 502a. As an example, in the illustrated embodiment, the network locality 502b may have a shorter approximate network transmission time to the network locality 502a, as compared to an approximate network transmission time between the network locality 502c and the network locality 502a. Accordingly, in the example, if five shards are needed to reconstruct the data object, the storage system 130 may select the shards stored at the storage devices 134a and the storage devices 134b based on the approximate network transmission times. Thus, in some embodiments, shards corresponding to location identifiers included in the location list 310 have a shorter network transmission time than at least some shards corresponding to storage locations not included in the location list 310. Although the example is specific to approximate network transmission time, other schemes may additionally or alternatively be used to select the shards, such as latency, network load, or resource availability.

Although FIG. 5 illustrates the network processing device 110 communicating with the plurality of servers 132*a-n* directly, in some embodiments, the communications are performed via one or more load balancers (not shown). Similarly, other communications (e.g., between the server 132*a* of the network locality 502*a* and the server 132*b* of the network locality 502*b*) may be performed via one or more load balancers.

Figure 6:
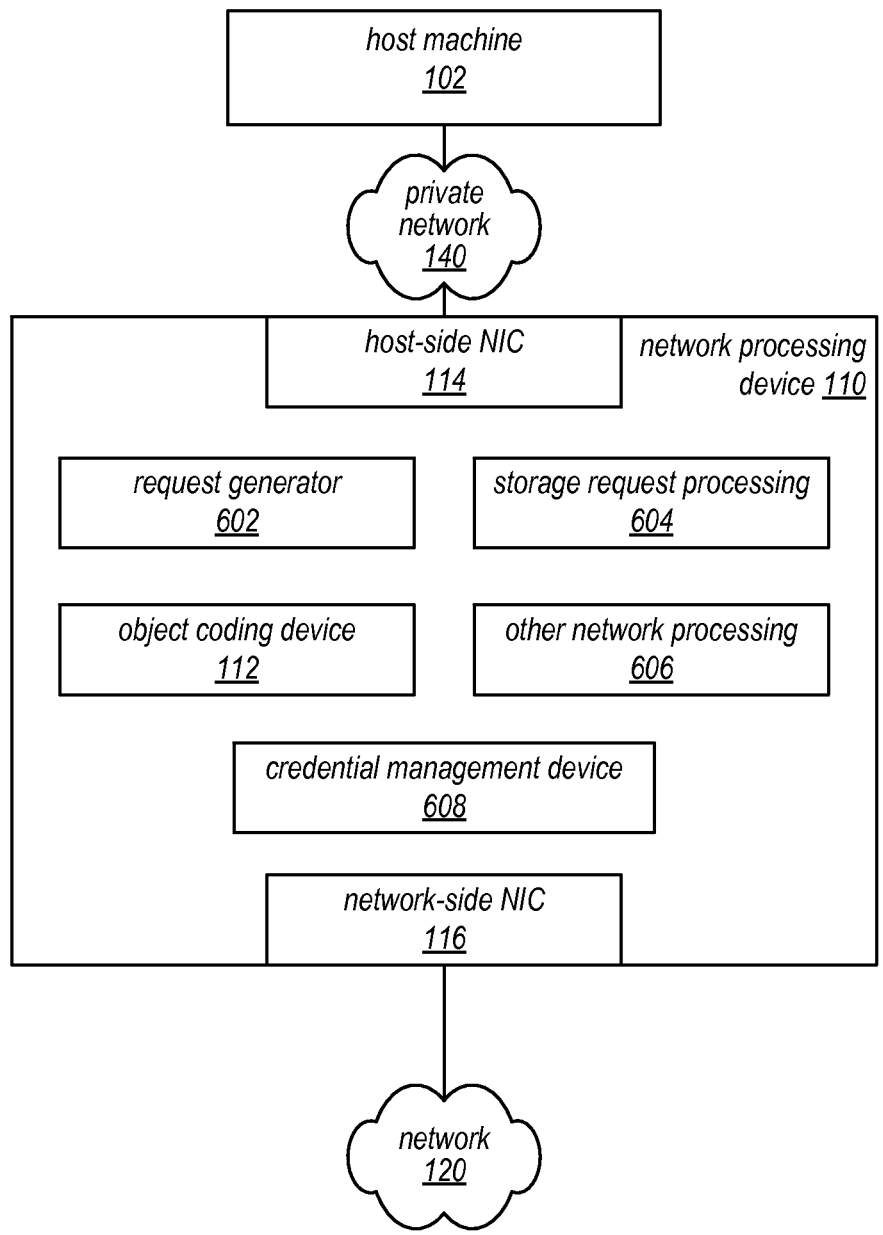
FIG. 6 is a block diagram illustrating an example network processing device, according to some embodiments.

FIG. 6 is a block diagram illustrating an example network processing device, according to some embodiments. In the illustrated embodiment, the network processing device 110 includes the object coding device 112, the host-side network interface controller (NIC) 114, and the network-side NIC 116 described above with reference to FIG. 1. The network processing device 110 may further include a request generator 602, storage request processing device 604, other network processing devices 606, and a credential management device 608. In this example, the network processing device illustrated in FIG. 6 is described as being the network processing device 110 of FIG. 1. However, the network processing device 110 may include other components not described herein or may not include some components described herein.

As explained above, the object coding device 112 may receive shards of a requested data object and may reconstruct the data object from at least a subset of the received shards. As further described below, the object coding device 112 may also encode a host data object received from the host machine 102 into a plurality of shards (host shards) according to a sharding technique. As explained above, the host-side NIC 114 may be coupled to the private network 140 which is also coupled to the host machine 102. Accordingly, in some embodiments, the host-side NIC 114 may receive data packets from the host machine 102 and may transmit data packets to the host machine 102. As explained above, the network-side NIC 116 may be coupled to the network 120. Accordingly, in some embodiments, the network-side NIC 116 may transmit data packets to the storage system 130 and may receive data packets from the storage system 130. The other network processing devices 606 may enable the network processing device 110 to perform additional networking duties.

In some embodiments, the storage request processing device 604 analyzes data packets received from the host machine 102 to determine whether the network processing device 110 should perform a coding operation on the received data packets. For example, the storage request processing device 604 may receive the data packet 202 of FIG. 2 and determine that the data packet 202 includes a request for a data object. As another example, as further described below with reference to FIGS. 9-11, the storage request processing device 604 may be configured to identify a request to store a data object according to a sharding technique.

In some embodiments, the request generator 602, in response to the storage request processing device 604 determining that the network processing device 110 should perform a coding operation on received data packets, generates requests to the storage system 130. For example, in response to the storage request processing device 604 determining that a received packet includes a request for a data object, the request generator 602 may generate a data object request (e.g., the data object request 206 of FIG. 2) that requests the data object and indicates that the network processing device 110 is capable of reconstructing the data object (e.g., by including the in-line object reconstruction indicator 306 of FIG. 3A). Further, in response to receiving the location list 310, the request generator 602 may generate a plurality of shard requests (e.g., the plurality of shard requests 210*a-n* of FIG. 2) requesting shards corresponding to location identifiers listed in the location list. As further described below with reference to FIGS. 9-11, the request generator 602 may also generate an object storage request that requests a plurality of storage locations of the storage system 130 to store a plurality of host shards. Further, the request generator 602 may generate a plurality of storage requests that each include a location identifier (e.g., corresponding to a particular memory location of a particular storage device of the plurality of storage devices 134) for storage of a corresponding shard. In some embodiments, the request generator 602 addresses at least two of the plurality of storage requests to different servers of the plurality of servers 132*a-n* (e.g., addresses one request to the server 132*a* and addresses another request to the server 132*b*). In some embodiments, the request generator 602 sends all of the plurality of storage requests to one or more load balancers which send the plurality of storage requests to the plurality of servers 132*a-n*.

In some embodiments, the credential management device 608 manages credentials such that the network processing device 110 is able to correctly and securely manage communications between the host machine 102 and the storage system 130. In some embodiments, data packets transmitted between the host machine 102 and the network processing device 110 and data packets transmitted between the network processing device 110 and the storage system 130 are transmitted according to a TCP protocol or a SSL protocol. In other embodiments, the data packets are transmitted according to a user datagram protocol (UDP).

For example, in some embodiments, when a data packet from the host machine 102 is unencrypted, in response to the storage request processing device 604 determining that the data packet includes a request for a data object, the credential management device 608 is configured to retrieve one or more credentials associated with the storage system 130 (e.g., credentials that identify an encryption scheme the storage system 130 is able to decrypt) and to encrypt the associated data object request (e.g., generated by the request generator 602) according to the retrieved credentials.

As a different example, in some embodiments, when a data packet from the host machine 102 is encrypted, prior to the storage request processing device 604 determining that the data packet includes a request for a data object, the credential management device 608 is configured to decrypt the data packet (e.g., using one or more credentials associated with the host machine 102). In the different example, after the data object request is generated, the credential management device may encrypt the data object request according to retrieved credentials. The credential management device 608 may also initiate sending signals (e.g., the response packet 204) to the host machine 102 according to a handshake protocol in response to the storage request processing device 604 determining that the data packet includes the request for the data object.

Figure 7:
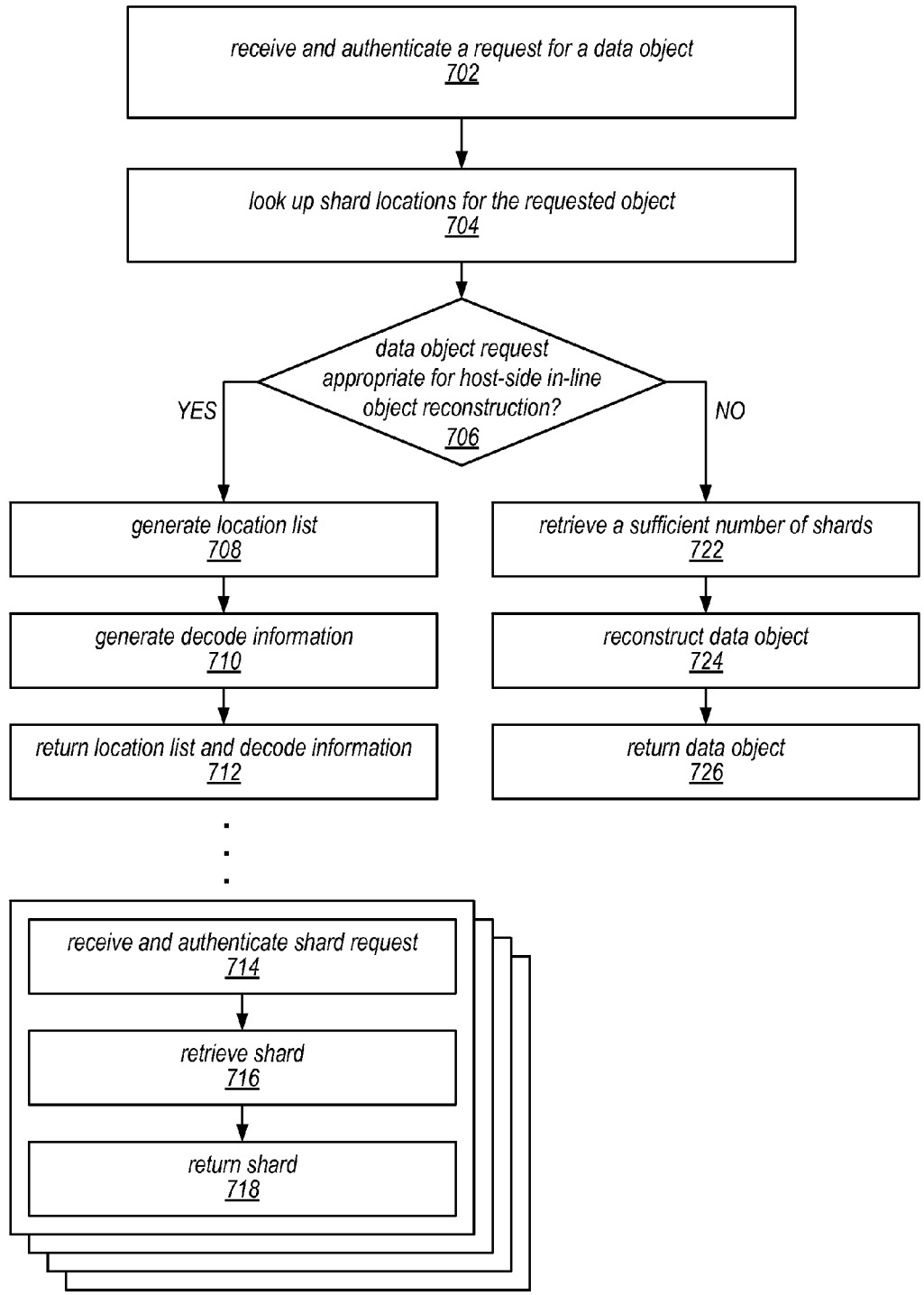
FIG. 7 is a flow diagram illustrating one embodiment of a method for providing a data object that has been stored by a storage service.

As described above, in one example of a storage service, a client may request a data object from storage in a storage system that includes a plurality of data storage devices. The data object may be stored as a plurality of shards. One or more servers may retrieve the shards of the data object from storage. The data object may be decoded prior to being provided to the client. One embodiment of a method for providing a data object that has been stored by a storage service is illustrated by the flow diagram of FIG. 7. Although FIG. 7 illustrates operations being performed in a particular order, in other embodiments, some operations may be performed in other orders.

As illustrated at 702, in this example, the method may include a server of a storage system receiving and authenticating a request for a data object. In some embodiments, the request may be received and authenticated at the server 132b of the storage system 130 of FIGS. 1 and 2. As illustrated at 704, in this example, the method may include the server looking up shard locations for the requested object. For example, the server 132b may look up or determine shard locations within the plurality of storage devices 134 that correspond to the requested object.

As illustrated at 706, in this example, the method may include the server determining whether the data object request is appropriate for host-side in-line object reconstruction. For example, the server 132b may determine whether the data object request includes an in-line object reconstruction indicator. If the data object request does not include an in-line object reconstruction indicator, the server 132b may determine that the data object request is not appropriate for host-side in-line object reconstruction. As another example, the server 132b may determine that a size of the requested data object is smaller than a size threshold and may consequently determine that the data object request is not appropriate for host-side in-line object reconstruction. Although 706 is illustrated as being after authenticating the request and looking up the shard locations, in other embodiments, 706 is performed before authenticating the request and/or looking up the shard locations.

As illustrated at 708, in this example, the method may include, in response to the server determining that the data object request is appropriate for host-side in-line object reconstruction, the server generating a location list. For example, the server 132b may generate the location list 310 of FIG. 3B that includes the plurality of location identifiers 312a-n, which may list locations where shards of the requested data object are stored. In other embodiments, the location identifiers 312a-n identify servers of the plurality of servers 132a-n to address to receive the corresponding shards of the requested data object. As illustrated at 710, in this example, the method may include the server generating decode information for the plurality of shards. For example, the server 132b may generate a decode matrix or may retrieve a decode matrix (e.g., the object reconstruction information 314) that may be used to decode the requested data object from the shards corresponding to the plurality of shard locations 312a-n of the location list 310. In some embodiments, generating the decode information may be performed prior to generating the location list or prior to looking up the shard locations for the data object. As illustrated at 712, in this example, the server may return the location list and the decode information to the requesting device. For example, the server 132b may return the location list 310 and the object reconstruction information 314 to the widget 110 as part of the data object response 208 of FIGS. 2 and 3B.

As illustrated by FIG. 7, 714-718 may be performed by the same server that performed 702-712 or by a different server from the server that performed 702-712. Further 714-718 may be performed by several servers in parallel. As illustrated at 714, in this example, a server may receive and authenticate a shard request. The shard request may correspond to a location identifier that was previously included in the location list. For example, the server 132a may receive and authenticate a shard request from the network processing device 110 that corresponds to a location identifier 312 of the location list 310. As illustrated at 716, in this example, the server may retrieve the requested shard. For example, the server 132a may retrieve the requested shard from a particular storage device of the plurality of storage devices 134. As illustrated at 718, in this example, the server may return the retrieved shard. For example, the server 132a may return the retrieved shard to the network processing device 110. In some embodiments, the network processing device 110 reconstructs the data object from the retrieved shards and provides the data object to the host machine 102. Thus, the method of FIG. 7 may enable providing a data object that has been stored by a storage service.

As illustrated at 722, in this example, the method may include, in response to the server determining that the data object request is not appropriate for host-side in-line object reconstruction, the server retrieving a sufficient number of shards. For example, the server 132b may retrieve a sufficient number of shards to reconstruct the requested data object by requesting shards from the plurality of storage devices 134. As illustrated at 724, in this example, the method may include the server reconstructing the data object 724. For example, the server 132b may reconstruct the data object based on the retrieved shards. As illustrated at 724, in this example, the method may include the server returning the data object to a requesting device (e.g., to a host machine or to a network processing device). For example, the server 132b may return the reconstructed data object to the host machine 412 of FIG. 4. Thus, the method of FIG. 7 may enable providing a data object that has been stored by a storage service.

Figure 8:
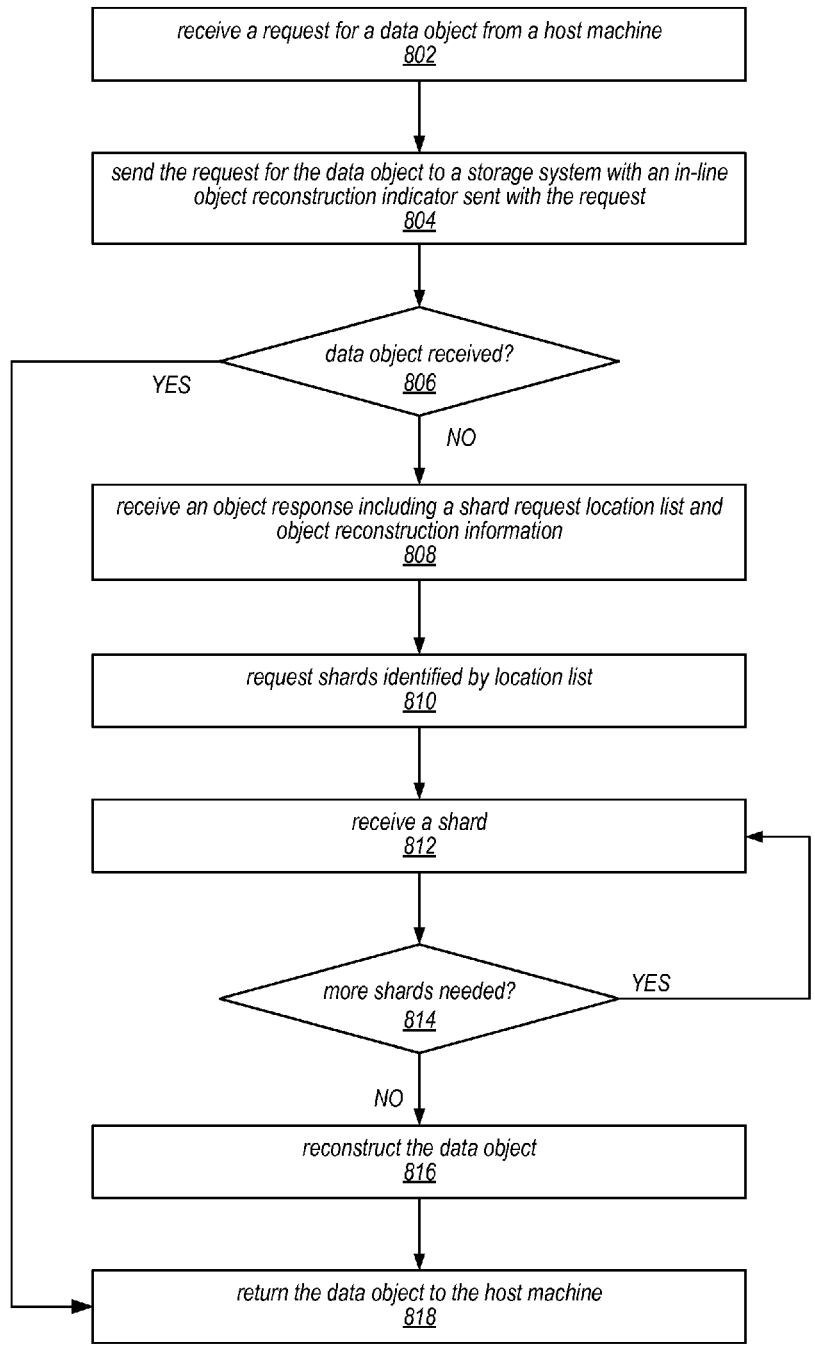
FIG. 8 is a flow diagram illustrating one embodiment of a method for retrieving and reconstructing a data object that has been stored by a storage service.

As described above, in one example of a storage service, a network processing device (e.g., the network processing device 110 of FIG. 1) may request a data object from storage in a storage system that includes a plurality of data storage devices. The data object may be stored as a plurality of shards. One or more servers may retrieve the shards of the data object from storage. The data object may be reconstructed by the network processing device prior to being provided to a host machine. One embodiment of a method for retrieving and reconstructing a data object that has been stored by a storage service is illustrated by the flow diagram of FIG. 8. Although FIG. 8 illustrates operations being performed in a particular order, in other embodiments, some operations may be performed in other orders.

As illustrated at 802, in this example, the method may include a network processing device receiving a request for a data object from a host machine. In some embodiments, the data packet 202 including a request for a data object is received at the network processing device 110 from the host machine 102 of FIG. 1. As illustrated at 804, in this example, the method may include the network processing device sending the request for the data object to a storage system with an in-line object reconstruction indicator sent with the request. For example, the network processing device 110 may send the data object request 206 of FIG. 2 including the in-line object reconstruction indicator 306 of FIG. 3A to the storage system 130.

As illustrated at 806, in this example, the method may include determining whether a data object was received in response to the request for the data object. For example, as described above with reference to FIG. 1, the storage system 130 may determine that a size of the data object does not exceed a size threshold, and accordingly, the storage system 130 reconstructs the data object and transmits the data object to the network processing device 110. Thus, the network processing device 110 may receive the data object from the storage system 130 in response to the request for the data object. If the data object is received from the storage system 130, the method may proceed to returning the data object to the host machine, at 818. Alternatively, as described above with reference to FIG. 1, the network processing device 110 may receive an object response from the storage system 130.

As illustrated at 808, in this example, the method may include the network processing device receiving an object response including a shard request location list and object reconstruction information. For example, the network processing device 110 may receive the data object response 208 of FIGS. 2 and 3B including the location list 310 and the object reconstruction information 314. In another embodiment, the location list 310 and the object reconstruction information 314 may be received separately. As illustrated at 810, in this example, the method may include the network processing device requesting shards identified by the location list. For example, the network processing device 110 may send the plurality of shard requests 210a-n to the storage system 130.

As illustrated at 812 and 814, in this example, the method may include the network processing device iteratively receiving shards, at 812, and determining whether more shards are needed to reconstruct the data object, at 814. For example, the network processing device 110 may receive the plurality of shard responses 212a-n from the storage system 130. In some embodiments, more shards may be received after the network processing device has received a sufficient number of shards to reconstruct the data object. In some embodiments, excess shards may be ignored by the network processing device.

As illustrated at 816, in this example, the method may include, in response to a sufficient number of shards being received to reconstruct the data object, the network processing device reconstructing the data object. For example, the network processing device 110 may reconstruct the data object at the object coding device 112 (e.g., using the shards and the object reconstruction information 314). As illustrated at 818, in this example, the method may include the network processing device returning the data object to the host machine. For example, the network processing device 110 may return the (reconstructed) data object 214 to the host machine 102. Thus, the method of FIG. 8 may enable retrieving and reconstructing a data object that has been stored by a storage service.

Figure 9:
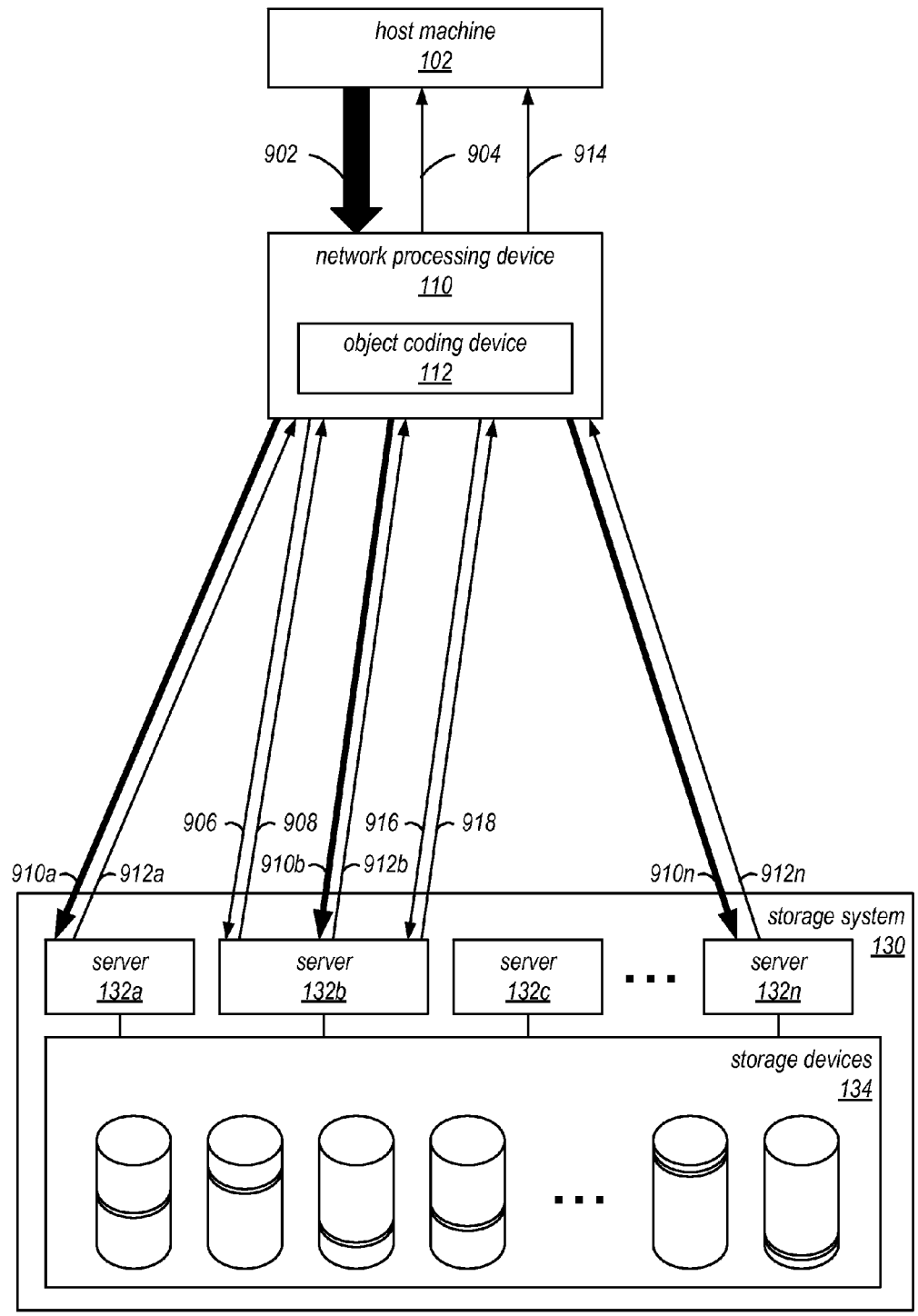
FIG. 9 is a block diagram illustrating an example of a storage operation, including an encoding operation implemented by a host-side network processing device, according to at least some embodiments.

FIG. 9 illustrates an example of a storage operation, including an encoding operation implemented by a host-side network processing device, according to at least some embodiments. With reference to FIG. 9, an illustrative response to request to store a host data object from a host machine will be described. In a particular embodiment, the host data object is encoded into a plurality of host shards according to a sharding technique by the network processing device 110 of FIG. 1. In this example, for clarity purposes, portions of the system of FIG. 1 are not illustrated, though they may be present and may operate as described previously. For example, messages may be passed from the host machine 102 using the NIC 106. Similarly, signals between the network processing device 110 and the storage system 130 may be transmitted via the network 120.

In some embodiments, the host machine 102 may transmit a data packet 902 to the network processing device 110. The data packet 902 may include a host data object and a request to store the host data object. In other embodiments, the host data object and the request to store the host data object are received separately (e.g., via the data packet 902 and another data packet). In a particular embodiment, the data packet 902 is encrypted (e.g., because the host machine 102 believes it is sending the data packet over the network 120 to the storage system 130). In the particular embodiment, the network processing device 110 may decrypt the data packet and detect the host data object and the request to store the host data object. In the particular embodiment, the network processing device 110 may send a response packet 904 (e.g., a handshake response) to the host machine 102, acknowledging the request to store the host data object. In some embodiments, the response packet 904 may be formatted such that the host machine 102 determines that the response packet 904 is received from the storage system 130. In a different particular embodiment, the data packet 902 is not encrypted (e.g., the data packet 902 is transmitted in a "clear-text" format). In such embodiments, the host machine 102 may send the data packet 902 to the network processing device 110 unencrypted because the host machine 102 expects the network processing device 110 to encrypt the host data object and a request to store the host data object (e.g., the host machine 102 is aware of the network processing device 110). Accordingly, the network processing device 110 may be configured to encrypt a message sent to the storage system 130.

In some embodiments, the network processing device 110 forms a data object storage request 906 using object information (e.g., an access control list corresponding to the data object, a requested storage size corresponding to a memory size of each host shard of the data object, and/or object reconstruction information) and contents of the data packet 902 (e.g., credentials associated with the host machine 102). The network processing device 110 may send the data object storage request 906 to the storage system 130. In some embodiments, the network processing device 110 does not address the data object storage request 906 to a particular server of the plurality of servers 132a-n. For example, the storage system 130 may be addressable via a main address (e.g., a main uniform resource locator (URL) or a main uniform resource indicator (URI)) for the storage system 130. In the example, the storage system 130 may determine which server of the plurality of servers 132a-n receives the data object storage request 906 (e.g., based on a load balancing scheme). In other embodiments, the network processing device 110 addresses a specific server (e.g., the server 132b).

In the illustrated embodiment, the data object storage request 906 is received by the server 132b. In the illustrated embodiment, the server 132b determines that the host machine 102 is authorized to request storage of the host data object. The server 132b may also validate other information regarding the host data object (e.g., verifying that the host machine 102 is authorized to request storage of a data object of the size of the host data object). In other embodiments, in response to a particular server determining that a particular host machine is not authorized to request storage of a particular host data object, the server may provide an error message to the particular host machine, ignore the request to store the particular host data object, or perform another action according to an error protocol.

In the illustrated embodiment, after authorizing the data object storage request 906, the server 132b determines (e.g., generates or retrieves) a storage identifier for the host data object. In the illustrated embodiment, the server 132b also determines object reconstruction information (e.g., an encoding matrix) for the host data object. The object reconstruction information may be used to decode the host data object (e.g., after a data object request from the host machine 102, such as described above with respect to FIG. 2). The server 132b may request storage of the object reconstruction information (e.g., at one or more of the plurality of storage devices 134). In other embodiments, the data object storage request 906 includes the object reconstruction information for the host data object. In the illustrated embodiment, the server 132b generates a location list corresponding to the host data object. The location list may include a plurality of location identifiers (e.g., storage locations or identifiers which can be used to recognize storage locations by the storage system 130), where each location identifier corresponds to a different respective host shard of the plurality of host shards. Each location identifier may point to a particular memory location of a respective storage device of the plurality of storage devices 134. In some embodiments, each location identifier indicates a server of the plurality of servers 132a-n to address with a corresponding host shard request. In some embodiments, each location identifier is encoded such that the network processing device 110 is unable to decode the plurality of location identifiers. In some embodiments, each location identifier may include the storage identifier or a portion of the storage identifier. Generating the location list may include determining available storage locations at a plurality of the plurality of storage devices. A memory size associated with each available storage location may be determined based on a policy of the storage system 130 or may be determined based on a size indicated by the object information of the data object storage request 906.

In the illustrated embodiment, the server 132b generates a data object storage response 908 that includes the storage identifier and the location list and returns the data object storage response 908 to the network processing device 110. In some embodiments, the data object storage response 908 includes an encoding matrix for the host data object. In some embodiments, the data object storage response 908 includes a shard size limit specifying the memory size associated with each available storage location. In other embodiments, the storage system 130 (e.g., the server 132b) may be configured to determine that the storage system 130 should encode the host data object (e.g., based on a processing load at the storage system 130 or based on a size of the host data object). In such embodiments, the storage system 130 may, instead of sending the location list to the host-side network processing device 110, send a request for the data object. In such embodiments, the storage system 130 receives the host data object and encodes the host data object according to the sharding technique.

In the illustrated embodiment, the object coding device 112 determines an encoding matrix for the host data object and applies the host data object to the encoding matrix to produce an encoded host data object. In some embodiments, the encoding matrix is received from the storage system 130. In other embodiments, the object coding device 112 generates the encoding matrix. The object coding device 112 may separate the encoded host data object into a plurality of host shards for storage at the storage system 130. In some embodiments, the size of the host shards is determined according to a policy of the storage system 130. In other embodiments, the object coding device 112 is configured to separate the encoded host data object into a predetermined number of host shards. The plurality of host shards may be generated such that the host data object can be reconstructed using a subset of the plurality of host shards. The subset of the plurality of host shards may include all host shards of the plurality of host shards or less than all host shards of the plurality of host shards.

In the illustrated embodiment, in response to receiving the data object storage response 908, the network processing device 110 generates a plurality of shard storage requests 910a-n that each includes a respective host shard of the encoded host data object. In the illustrated embodiment, each shard storage request of the plurality of shard storage requests 910a-n may correspond to a different respective location identifier from the location list. In some embodiments, each of the plurality of shard storage requests 910a-n includes the storage identifier (e.g., explicitly or as part of the respective location identifier).

As shown in the illustrated embodiment, the plurality of shard storage requests 910a-n may be received at the storage system 130 at different servers of the plurality of servers 132a-n (e.g., the server 132a and the server 132b). In some embodiments, the plurality of shard storage requests 910a-n are received at the plurality of servers 132a-n via different network paths. In some embodiments, a particular server may receive more than one shard storage request. In some embodiments, not every server of the plurality of servers 132a-n receives a shard storage request of the plurality of shard storage requests 910a-n. For example, in the illustrated embodiment, the server 132c does not receive a shard storage request. In the illustrated embodiment, the server 132b, which provided the data object storage response 908 to the network processing device 110, receives the shard storage request 910b. However, in other embodiments, a given server which provides a data object storage response may not receive a shard storage request. In some embodiments, each server that received a shard storage request may decode a corresponding location identifier included in the shard storage request to determine a storage location for the corresponding host shard included in the shard storage request. In some embodiments, the storage identifier may be stored with one or more of the shards corresponding to the plurality of shard storage requests 910a-n. Each server of the plurality of servers 132a-n that received a shard storage request may transmit a confirmation message to the network processing device as one of a plurality of shard storage responses 912a-n. In some embodiments, at least one of the shard storage requests 910a-n includes object reconstruction information (e.g., the encoding matrix) for the plurality of host shards. In response to receiving the object reconstruction information, the corresponding server of the plurality of servers 132a-n may store the object reconstruction information (e.g., so the object can be reconstructed after a subsequent object request).

As shown in the illustrated embodiment, the plurality of shard responses 912a-n may be received by the network processing device 110. In response to the network processing device 110 receiving a particular shard response, the network processing device 910 may determine that a respective shard storage response has been received for each of the plurality of shard storage requests 910a-n. In the illustrated embodiment, the network processing device 110 sends, to the storage system 130 (e.g., to the server 132b) a storage confirmation message 916 that indicates that a respective shard storage response of the plurality of shard storage responses 912a-n has been received for each of the plurality of shard storage requests 910a-n. The server 132b may determine, based on the storage confirmation message 916, that storage of the host data object is complete. In some embodiments, the storage confirmation message 916 includes the storage identifier. In some embodiments, the storage confirmation message 916 further includes an access control list that indicates which users have which permissions regarding the host data object. In other embodiments, the access control list is sent to the storage system 130 as a separate communication, as part of the data object storage request 906, or as part of one or more of the plurality of shard storage requests 910a-n. In some embodiments, in response to the storage confirmation message 916, the server 132b makes the host data object accessible to requests by users and operations by the storage system 130. In the illustrated embodiment, the server 132b sends, to the network processing device, a storage confirmation acknowledgement 918 that acknowledges that the storage confirmation message 916 has been received.

In the illustrated embodiment, in response to the host-side network processing device 110 receiving the storage confirmation acknowledgement 918, the host-side network processing device 110 indicates, via a storage confirmation indicator 914, to the host machine 102 that the host data object has been successfully stored. In other embodiments, the storage confirmation indicator 914 may be sent to the host machine 102 concurrently with sending the storage confirmation message 916 to the storage system 130. In some embodiments, the network processing device 110 may encode the storage confirmation indicator 914 according to an encryption protocol prior to providing the storage confirmation indicator 914 to the host machine 102.

Although FIG. 9 illustrates the plurality of host shards being generated after transmitting the data object storage request 906 to the storage system 130, in other embodiments, the plurality of host shards may be generated while the data object storage request 906 is being transmitted to the storage system 130 or before the data object storage request 906 is transmitted to the storage system 130 (e.g., because the encoding matrix is precoded at the host-side network processing device 110 or because the host-side network processing device 110 is configured to generate the encoding matrix). In some embodiments, the plurality of host shards are not generated until the storage system 130 specifies a shard size (e.g., according to a policy of the storage system 130) as part of the data object storage response 908. In some embodiments, the host shards are generated prior to the data object storage response 908, but are re-generated from the encoded host data object in response to the network processing device 110 determining that the data object storage response 908 specifies a shard size that differs from a size of the host shards.

Although FIG. 9 illustrates the network processing device 110 transmitting signals (e.g., the data object storage request 906) to the plurality of servers 132a-n directly, in some embodiments, the network processing device 110 sends signals to one or more load balancers, which forward the signals to the plurality of servers 132a-n. Similarly, Although FIG. 9 illustrates the network processing device 110 receiving signals (e.g., the data object storage response 908) from the plurality of servers 132a-n directly, in some embodiments, the plurality of servers 132a-n send signals to one or more load balancer, which forward the signals to the network processing device 110.

Figure 10A:
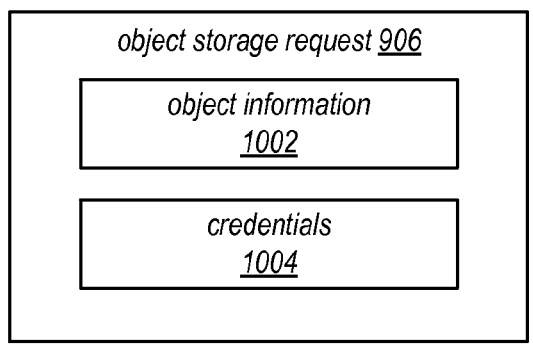
FIG. 10A is a block diagram illustrating an example data object storage request, according to some embodiments.

FIG. 10A illustrates an example of the data object storage request 906 described by FIG. 9. In some embodiments, the data object storage request 906 may include object information 1002 and credentials 1004. In other embodiments, some or all of the illustrated components of the data object storage request 906 may be excluded from the data object storage request 906. For example, the credentials 1004 may not be required to store the host data object, and thus, the credentials 1004 may be omitted. The object information 1002 may identify the host data object. In some embodiments, the object information 1002 may include an access control list associated with the host data object. In some embodiments, the object information 1002 may include an encoding matrix used to encode the host data object into host shards. In some embodiments, the object information 1002 may include a host shard size that specifies an amount of storage space needed to store each host shard. The credentials 1004 may include security credentials of the host machine 102, the network processing device 110, or both. The credentials 1004 may be used by the storage system 130 to determine whether the host machine 102 is authorized to request storage of the host data object. The data object storage request 906 may be formatted such that the data object storage request 906 indicates to the storage system 130 that the network processing device 110 is capable of encoding the host data object into a plurality of host shards.

Figure 10B:
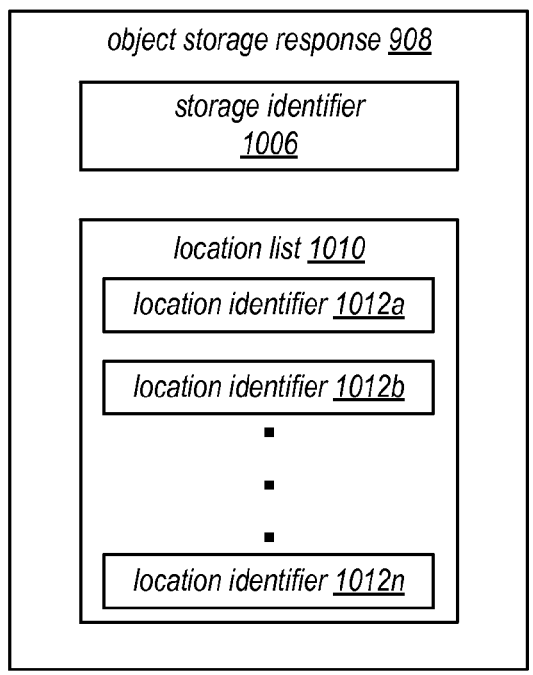
FIG. 10B is a block diagram illustrating an example data object storage response, according to some embodiments.

FIG. 10B illustrates an example of the data object storage response 908 described by FIG. 9. In some embodiments, the data object storage response 908 includes a storage identifier 1006 and a location list 1010. In another embodiment, the storage identifier 1006 is encoded into the location list 1010. In the illustrated embodiment, the location list 310 includes a plurality of location identifiers 312a-n, where each location identifier corresponds to a storage location designated to store a respective host shard of the host data object. For example, the location list 310 may include a list of URIs or URLs, where each URI or URL addresses a particular host shard and specifies a particular server of the plurality of servers 132a-n to store the host shard. Additionally, each location identifier 1012a-n of the location list 1010 may be encrypted such that the network processing device 110 cannot decrypt the location identifiers 1012a-n (e.g., the plurality of servers 132a-n will decrypt the location identifiers 1012a-n to determine the designated storage locations). In a particular embodiment, each location identifier of the plurality of location identifiers 312a-n specifies a different memory location corresponding to a different storage device of the plurality of storage devices 134.

Figure 11:
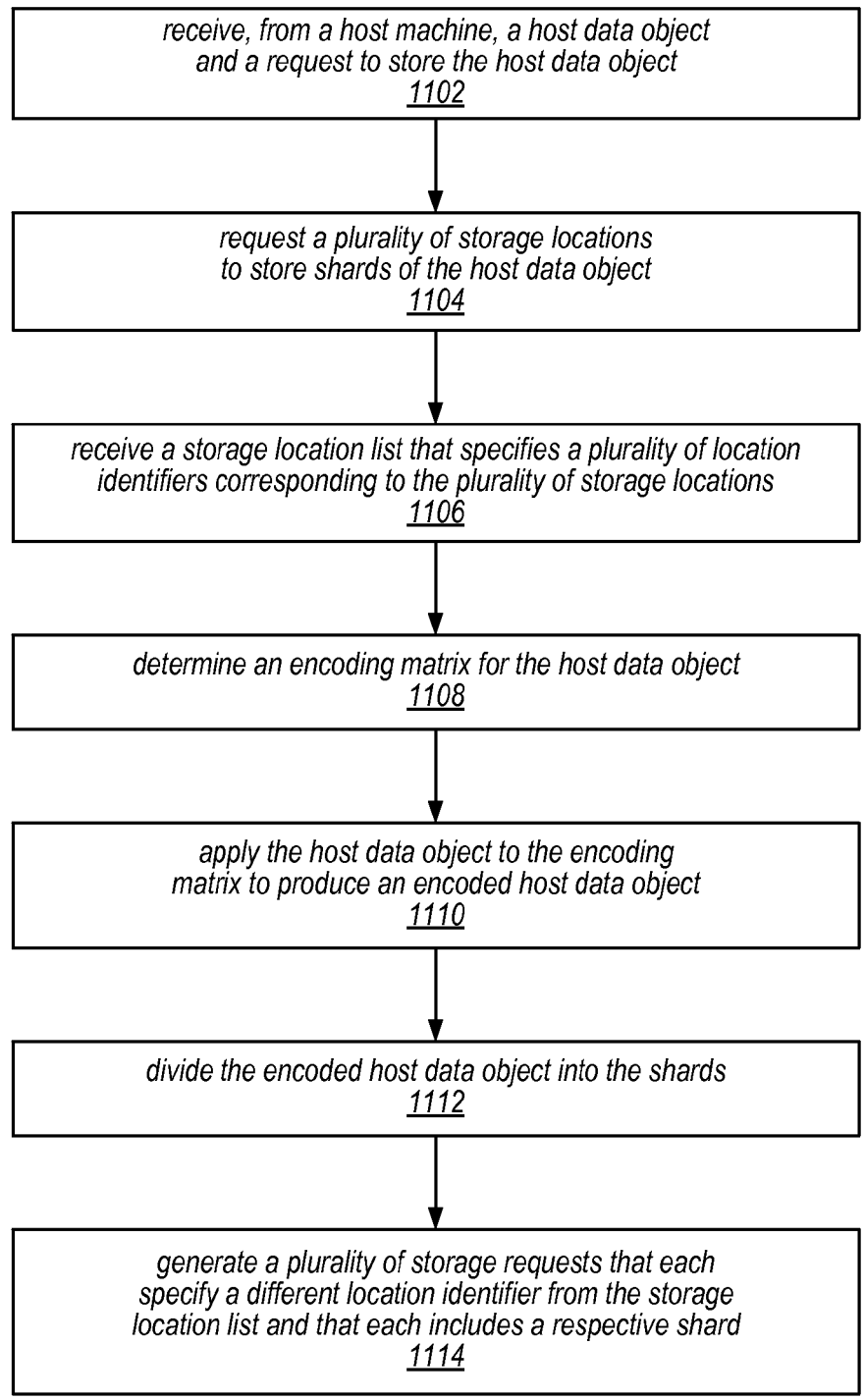
FIG. 11 is a flow diagram illustrating one embodiment of a method for encoding a data object for storage in a storage service.

As described above, in one example of a storage service, a client may upload, via a host machine and a network processing device, a data object from a client network for storage in a plurality of data storage devices of a storage system. The data object may be encoded by the network processing device prior to storage in the plurality of data storage devices. One embodiment of a method for encoding a data object for storage in a storage service is illustrated by the flow diagram of FIG. 11. Although FIG. 11 illustrates operations being performed in a particular order, in other embodiments, some operations may be performed in other orders.

As illustrated at 1102, in this example, the method may include receiving at the network processing device, from a host machine, a host data object and a request to store the host data object. For example, the network processing device 110 of FIG. 9 may receive, from the host machine 102, a request to store a host data object and a host data object. As illustrated at 1104, in this example, the method may include the network processing device requesting a plurality of storage locations to store the shards. For example, the request generator 602 of FIG. 6 may generate a request for a plurality of storage locations at the plurality of storage devices 134.

As illustrated at 1106, in this example, the method may include the network processing device receiving a storage location list that specifies a plurality of location identifiers corresponding to the plurality of storage locations. For example, the network processing device 110 may receive a storage location list from a server of the plurality of servers 132*a-n* that indicates a plurality of storage locations, where each storage location corresponds to a host shard of the plurality of host shards. As illustrated at 1108, in this example, the method may include determining an encoding matrix for the host data object. The encoding matrix may be received from the storage system 130 of FIG. 1, 2, 6, or 9.

As illustrated at 1110, in this example, the method may include the network processing device applying the host data object to the encoding matrix to produce an encoded host data object. For example, the object coding device 112 may produce the encoded host data object by applying the received data object to the encoding matrix. As illustrated at 1112, the method may include the network processing device dividing the encoded host data object into a plurality of shards. For example, the object coding device 112 may separate each row of the encoded host data object into a different shard of a plurality of shards.

As illustrated at 1114, in this example, the method may include the network processing device generating a plurality of storage requests that each specify a different location identifier from the storage location list and that each includes a respective host shard. For example, the request generator 602 may generate a plurality of storage location requests that each include a corresponding host shard of the plurality of host shards and that each specifies a location identifier of the storage location list. Thus, the method of FIG. 11 may encoding a data object according to a sharding technique for storage in a storage service.

Figure 12:
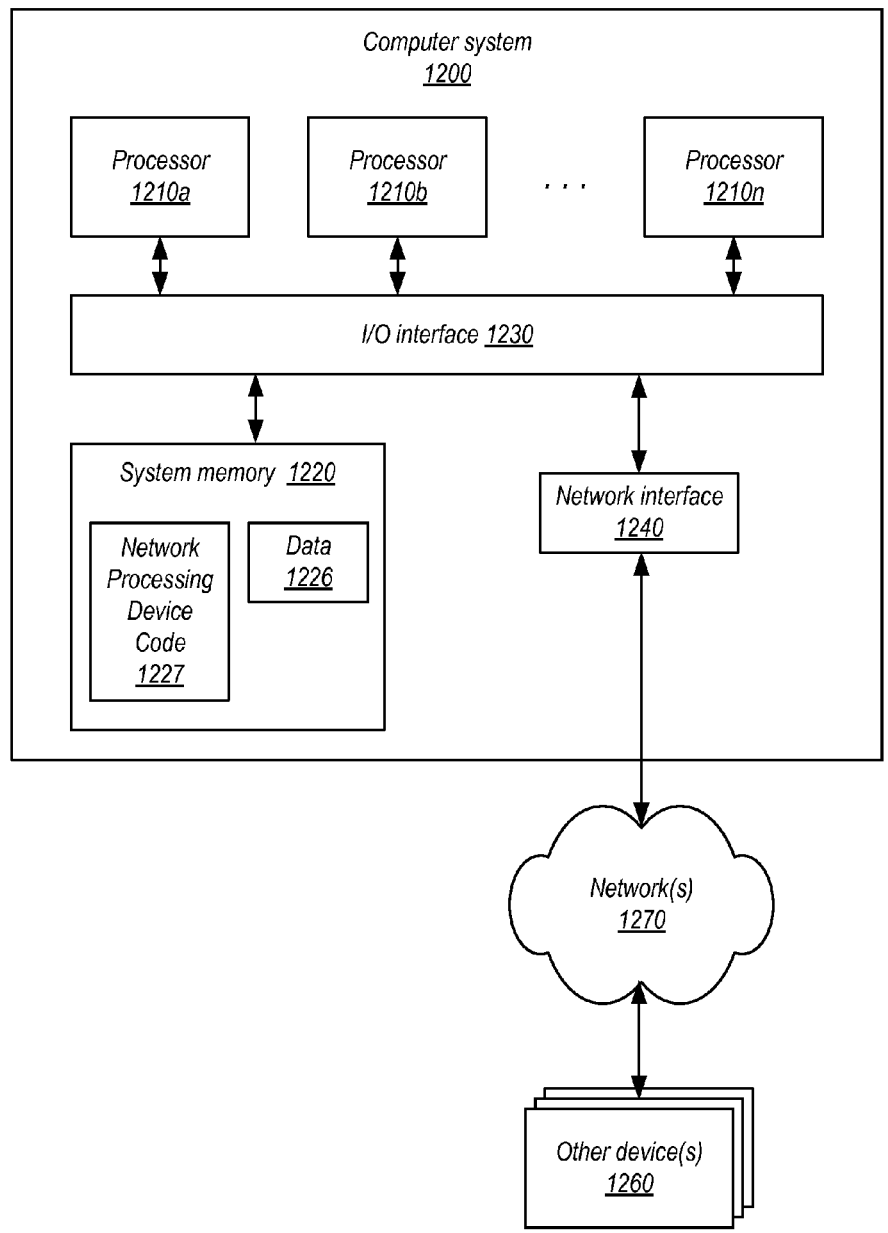
FIG. 12 is a block diagram illustrating one embodiment of a computer system configured to implement at least a portion of a network processing device, as described herein.

One embodiment of a computer system configured to implement at least a portion of a network processing device such as the network processing device 110 of FIG. 1 is shown in FIG. 12. In at least some embodiments, a server that implements a portion or all of the methods and apparatus for object coding (e.g., reconstruction and encoding) in a host-side processing system as described herein may include a general-purpose computer system that includes or is configured to access one or more computer-accessible media, such as a computer system 1200 illustrated in FIG. 12. In the illustrated embodiment, the computer system 1200 includes one or more processors 1210*a-n* coupled to a system memory 1220 via an input/output (I/O) interface 1230. The computer system 1200 further includes a network interface 1240 coupled to the I/O interface 1230.

In various embodiments, the computer system 1200 may be a uniprocessor system including one processor 1210*a*, or a multiprocessor system including several processors 1210*a-n* (e.g., two, four, eight, or another suitable number). The processors 1210*a-n* may be any suitable processors capable of executing instructions. For example, in various embodiments, the processors 1210*a-n* may be general-purpose or embedded processors implementing any of a variety of instruction set architectures (ISAs), such as the x86, PowerPC, SPARC, or MIPS ISAs, or any other suitable ISA. In multiprocessor systems, each of the processors 1210*a-n* may commonly, but not necessarily, implement the same ISA.

System memory 1220 may be configured to store instructions and data accessible by the processor(s) 1210. In various embodiments, the system memory 1220 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for object coding in a host-side processing device, are shown stored within the system memory 1220 as network processing device code 1227 and data 1226.

In one embodiment, the I/O interface 1230 may be configured to coordinate I/O traffic between a processor 1210, the system memory 1220, and any peripheral devices in the device, including the network interface 1240 or other peripheral interfaces. In some embodiments, the I/O interface 1230 may perform any necessary protocol, timing or other data transformations to convert data signals from one component (e.g., the system memory 1220) into a format suitable for use by another component (e.g., a processor 1210). In some embodiments, the I/O interface 1230 may include support for devices attached through various types of peripheral buses, such as a variant of the Peripheral Component Interconnect (PCI) bus standard or the Universal Serial Bus (USB) standard, for example. In some embodiments, the function of the I/O interface 1230 may be split into two or more separate components, such as a north bridge and a south bridge, for example. Also, in some embodiments some or all of the functionality of the I/O interface 1230, such as an interface to the system memory 1220, may be incorporated directly into a processor 1210.

The network interface 1240 may be configured to allow data to be exchanged between the computer system 1200 and other devices 1260 attached to a network or networks 1270, such as other computer systems or devices as illustrated or described in FIGS. 1 through 11, for example. In various embodiments, the network interface 1240 may support communication via any suitable wired or wireless general data networks, such as types of Ethernet network, for example. Additionally, the network interface 1240 may support communication via telecommunications/telephony networks such as analog voice networks or digital fiber communications networks, via storage area networks such as Fibre Channel SANs, or via any other suitable type of network and/or protocol.

In some embodiments, the system memory 1220 may be one embodiment of a computer-accessible medium configured to store program instructions and data as described above for FIGS. 1 through 11 for implementing embodiments of object coding in a host-side processing device. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to the computer system 1200 via the I/O interface 1230. A non-transitory computer-accessible storage medium may also include any volatile or non-volatile media such as RAM (e.g. SDRAM, DDR SDRAM, RDRAM, SRAM, etc.), ROM, etc., that may be included in some embodiments of the computer system 1200 as the system memory 1220 or another type of memory. Further, a computer-accessible medium may include transmission media or signals such as electrical, electromagnetic, or digital signals, conveyed via a communication medium such as a network and/or a wireless link, such as may be implemented via the network interface 1240.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD- ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
a storage system connected to a network, the storage system comprising a plurality of servers and a plurality of non-transitory storage devices, wherein the storage system is configured to store a plurality of data objects according to a sharding technique, wherein each respective data object of the plurality of data objects is stored as a respective plurality of shards, wherein each shard for the respective data object is stored on a different one of the plurality of storage devices than any other shard of the plurality of shards for the respective data object; and
a host-side network processing device, coupled between the network and a network connection to a host machine, and configured to:
receive, from the host machine, a data object and a request to store the data object;
send, to the storage system, a request for a plurality of storage locations of the storage system to store respective shards of the data object;
receive, from a particular server of the plurality servers, a location list including a plurality of location identifiers, wherein each location identifier corresponds to a respective storage location of the storage system;
determine an encoding matrix for the data object;
encode the data object into a plurality of shards based on the encoding matrix according to a sharding technique; and
generate a plurality of storage requests that each specify a different location identifier of the location list and that each includes a respective shard of the plurality of shards.

2. The system of claim 1, wherein the host-side network processing device is further configured to send, to the storage system, the plurality of storage requests, and wherein at least two storage requests of the plurality of storage requests are sent to the storage system via the network by different network paths.

3. The system of claim 1, wherein the host-side network processing device is further configured to:
receive, from respective servers of the plurality of servers in response to the plurality of storage requests, a plurality of respective storage responses that each confirm storage of a respective shard of the plurality of shards;
determine that a respective storage response of the plurality of storage responses has been received for each shard of the plurality of shards; and
send, to the storage system, a storage confirmation message that indicates that the respective storage responses have been received for each shard of the plurality of shards.

4. The system of claim 1, wherein the location identifiers are encrypted such that the host-side network processing device is unable to decrypt the location identifiers.

5. The system of claim 1, wherein the storage system is configured to:
receive, from the host-side network processing device, a different request for a different plurality of storage locations of the storage system to store different respective shards of a different data object;
determine that the storage system should encode the different data object into a different encoded data object; and
send, to the host-side network processing device, a request for the different data object.

6. A non-transitory, computer-readable storage medium storing program instructions that, when executed on one or more computers, cause the one or more computers to:
implement a server process configured to:
receive, from a host-side network processing device via a network coupled to the server, a request to store a data object as a plurality of shards;
generate a storage identifier for the data object and a location list that includes a plurality of location identifiers, wherein each location identifier specifies a different storage location for a respective shard of the plurality of shards;
send, in response to the request, the location list to the host-side network processing device;
receive, from the host-side network processing device, a particular storage request that includes a particular shard of the plurality of shards, wherein the particular storage request specifies a particular location identifier of the location list; and
send the particular shard and the storage identifier to be stored at a particular location of a particular storage device identified by the particular location identifier.

7. The non-transitory, computer-readable storage medium of claim 6,
wherein the server is part of a network-based storage service that comprises a plurality of storage devices,
wherein each location identifier on the location list corresponds to a different one of the plurality of storage devices,
wherein respective data objects are stored at the plurality of storage devices on behalf of a plurality of different clients, and
wherein at least some of the plurality of storage devices store shards for multiple different clients of the plurality of different clients.

8. The non-transitory, computer-readable storage medium of claim 6,
wherein the server is part of a network-based storage service that comprises a plurality of servers and a plurality of storage devices,
wherein the plurality of servers receives a plurality of storage requests each including a respective shard of the plurality of shards and a respective location identifier of the location list, and
wherein each of the plurality of storage requests is handled by a respective server selected based at least in part on a locality of the respective server to a respective storage device identified by the respective location identifier.

9. The non-transitory, computer-readable storage medium of claim 8, wherein, in response to sending the location list, the server is further configured to:
receive, from the host-side network processing device, a different storage request that includes a different shard of the plurality of shards, wherein the different storage request specifies a different location identifier of the location list; and
send the different shard to a different location of a different storage device identified by the different location identifier.

10. The non-transitory, computer-readable storage medium of claim 6,
wherein, in response to receiving the request to store the data object, the server is further configured to send the storage identifier to the host-side network processing device, and
wherein the particular storage request includes the storage identifier.

11. The non-transitory, computer-readable storage medium of claim 6, wherein, in response to the request, the server is further configured to:
determine object reconstruction information corresponding to the plurality of shards;
prior to receiving the particular shard, send the object reconstruction information to the host-side network processing device; and
send the object reconstruction information to a storage device.

12. The non-transitory, computer-readable storage medium of claim 6, wherein, in response to the request, the server is further configured to:
send object reconstruction information corresponding to the plurality of shards to a storage device, wherein the request comprises the object reconstruction information.

13. The non-transitory, computer-readable storage medium of claim 6, wherein in response to the request, the server is further configured to:
receive, from the host-side network processing device, an access control list; and
authenticate a request for the data object by comparing an identity of a requester corresponding to the request for the data object with the access control list.

14. The non-transitory, computer-readable storage medium of claim 6, wherein, prior to returning the location list, the server is configured to determine whether the host-side network processing device is authorized to request storage of the data object.

15. An apparatus, comprising:
a host-side network processing hardware device comprising:
a host-side network interface configured to:
receive a data packet from a host machine;
a storage request processing device configured to:
determine that the data packet includes a request for a storage system to store a data object according to a sharding technique;
a request generator configured to:
in response to the storage request processing device determining that the data packet includes the request for the storage system to store the data object, generate, for the storage system, an object storage request that requests a plurality of storage locations of the storage system to store a plurality of shards of the data object; and
in response to receiving a location list from the storage system, generating, for the storage system, a plurality of storage requests that each specify a respective location identifier from the location list, wherein each location identifier identifies a respective storage location of the storage system, and wherein each storage request of the plurality of storage requests includes a respective shard of the plurality of shards;
a network-side network interface configured to:
transmit the object storage request to the storage system; and
an object coding device configured to:
in response to receiving the data object, encode the data object into a plurality of shards according to the sharding technique.

16. The apparatus of claim 15, wherein the host-side network processing hardware device further comprises a credential management device configured to:
in response to the storage request processing device determining that the data packet includes the request for the storage system to store the data object, retrieve one or more credentials associated with the storage system; and
encrypt the object storage request based on the one or more credentials, wherein the data packet is unencrypted.

17. The apparatus of claim 16, wherein the host-side network processing hardware device further comprises a credential management device configured to:
prior to the storage request processing device determining that the data packet includes the request for the storage system to store the data object, decrypt, using credentials of the storage system, the data packet; and
encrypt the object storage request based on one or more credentials associated with the host machine.

18. The apparatus of claim 15,
wherein the host-side network interface is further configured to receive a different data packet from a host machine;
wherein the storage request processing device is further configured to determine that the different data packet includes a request for a requested data object stored at the storage system, wherein the data object is coded according to the sharding technique,
wherein the request generator is further configured to, in response to the storage request processing device determining that the different data packet includes the request for the requested data object, generate, for the storage system, a data object request that requests the requested data object and that indicates that the host-side network device is capable of reconstructing the data object, and
wherein the object coding device is further configured to:
receive, via the network-side network interface, at least a subset of a plurality of shards of the requested data object; and
reconstruct the requested data object from the at least a subset of the plurality of shards.

19. The apparatus of claim 18, wherein the request generator is further configured to:
in response to receiving, from the storage system, a different location list corresponding to the requested data object, generating a plurality of requested data object requests for at least a subset of the plurality of shards of the requested data object, wherein each requested data object request specifies a different location identifier of the different location list, wherein each different location identifier corresponds to a respective shard of the requested data object.

20. The apparatus of claim 19, wherein the different location identifiers identify at least two different servers of the storage system.

21. The apparatus of claim 19, wherein the different location identifiers are encrypted such that the host-side network processing hardware device is unable to decrypt the different location identifiers.

* * * * *